Aug. 10, 1954
R. F. BROUSSARD
2,685,953
PARKING METER
Filed Sept. 22, 1951
11 Sheets-Sheet 1
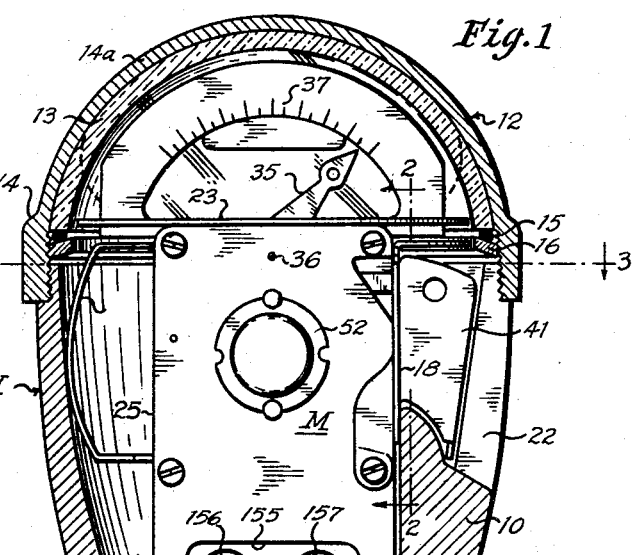
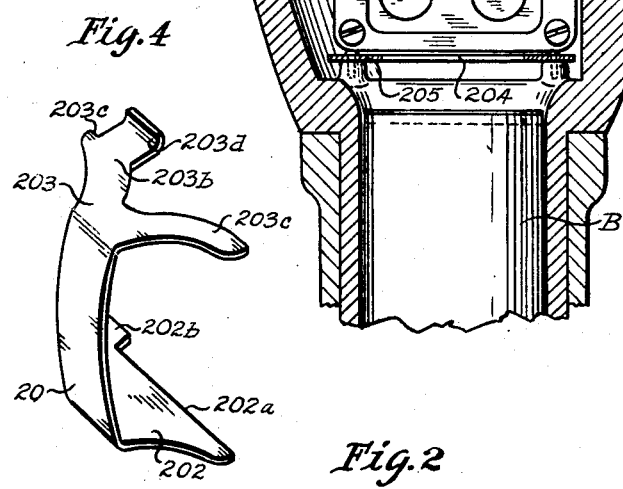
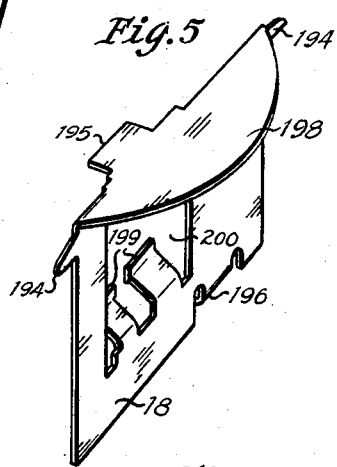
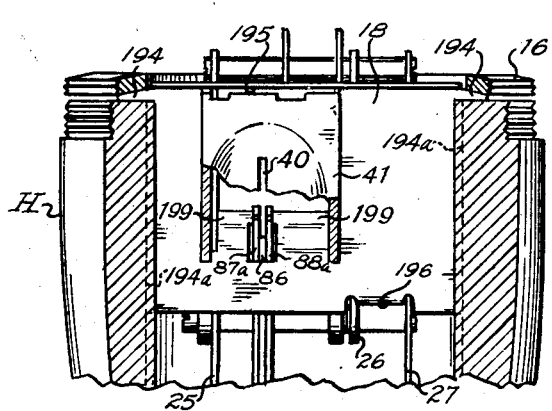
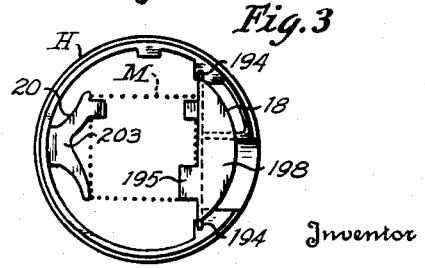
Inventor
Robert F. Broussard

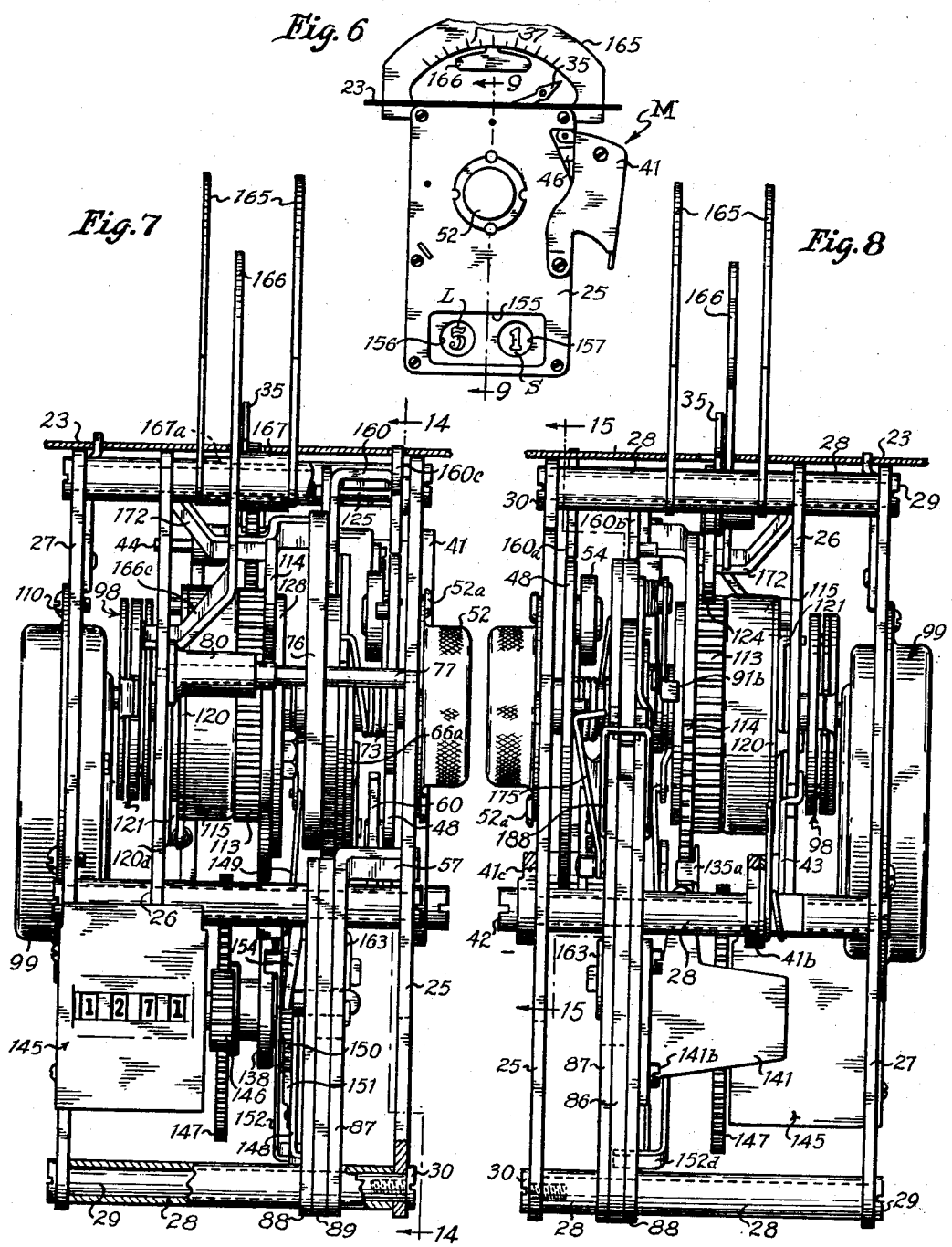

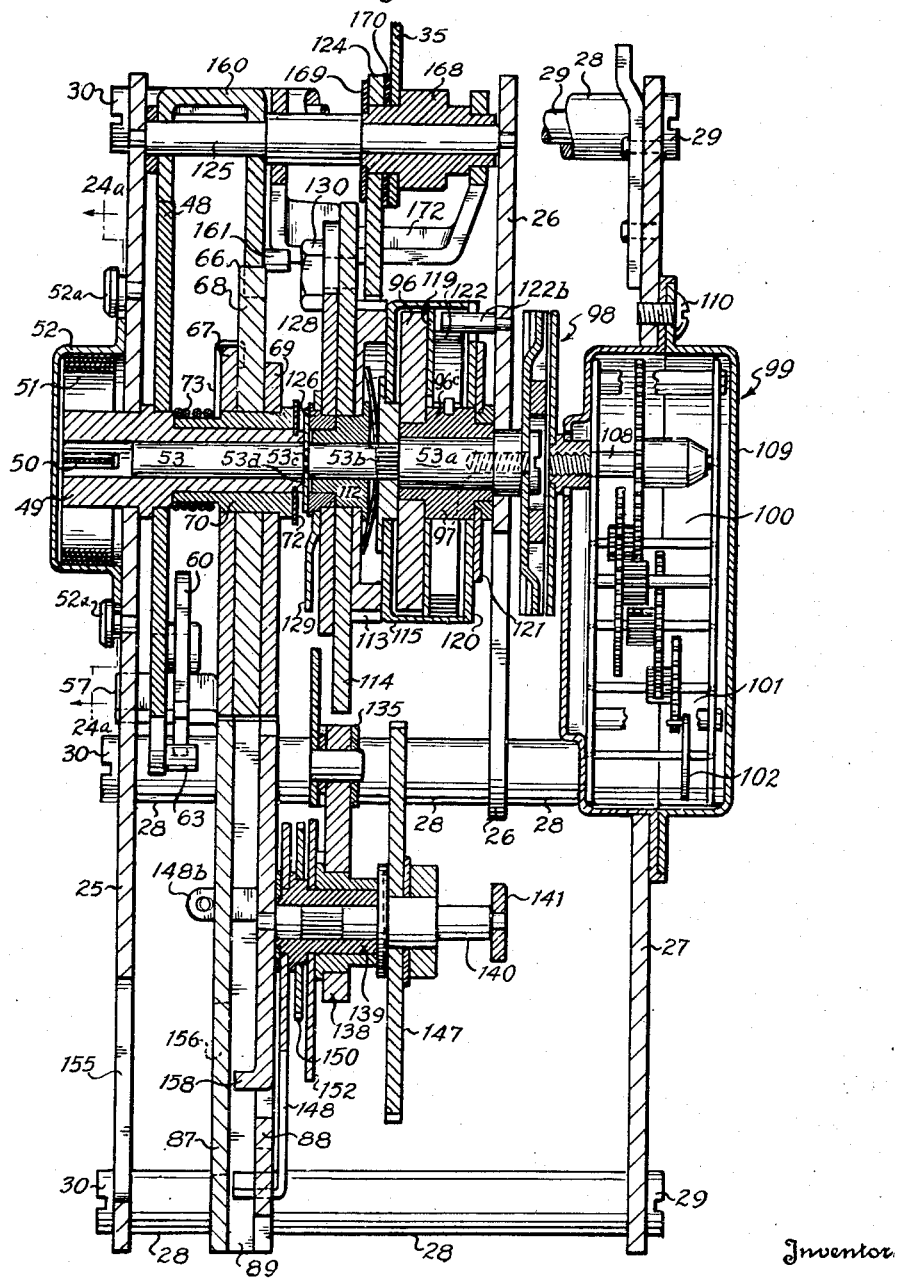

Aug. 10, 1954   R. F. BROUSSARD   2,685,953
PARKING METER
Filed Sept. 22, 1951   11 Sheets-Sheet 4
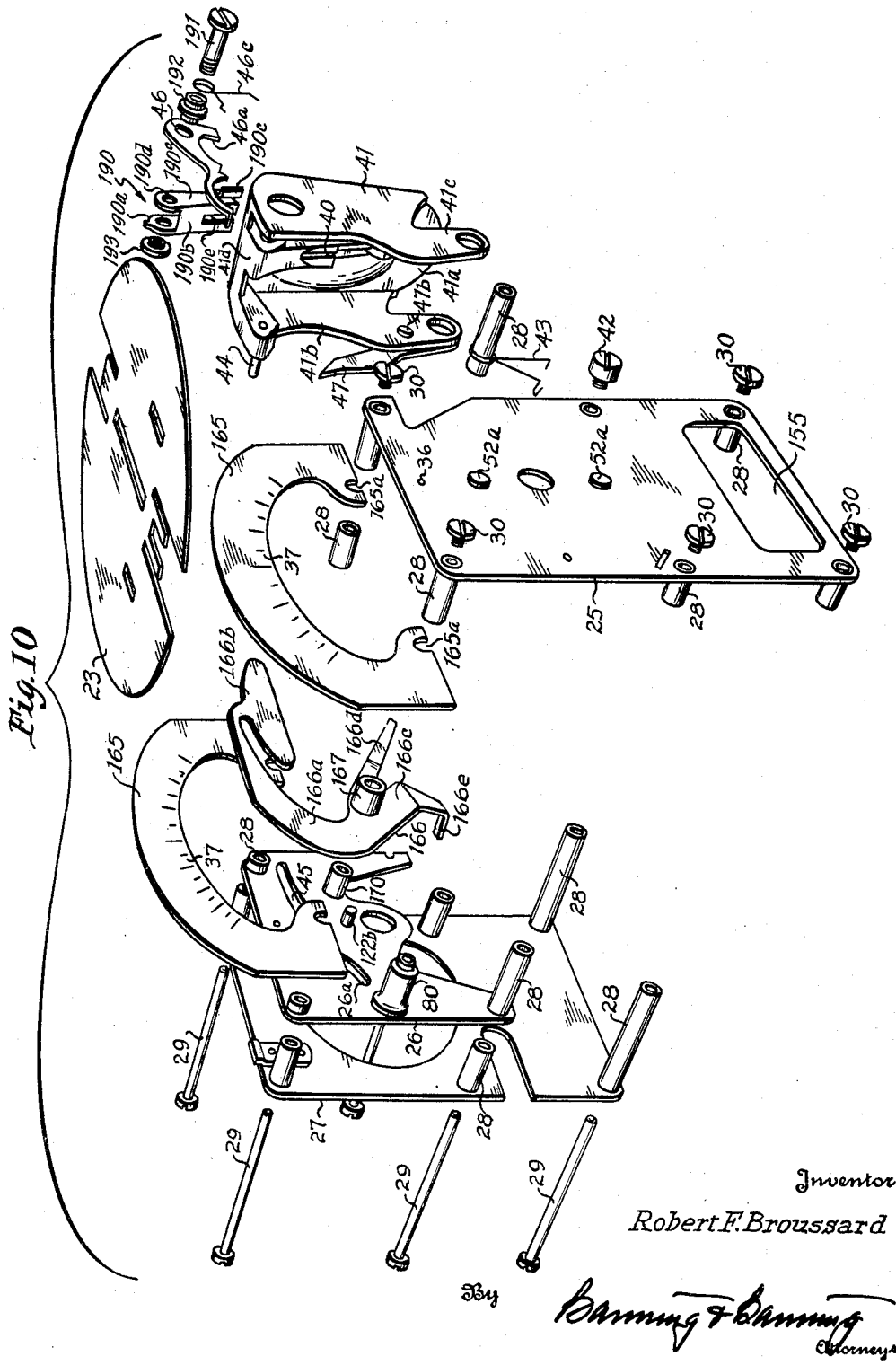
Inventor
Robert F. Broussard
By Banning & Banning
Attorneys Aug. 10, 1954  R. F. BROUSSARD  2,685,953
PARKING METER Filed Sept. 22, 1951  11 Sheets-Sheet 5

Inventor:
Robert F. Broussard by *Banning & Banning*
Attorneys

Aug. 10, 1954     R. F. BROUSSARD     2,685,953
PARKING METER

Filed Sept. 22, 1951     11 Sheets-Sheet 7

Inventor
Robert F. Broussard
By Canning & Canning
Attorneys

Aug. 10, 1954     R. F. BROUSSARD     2,685,953
PARKING METER

Filed Sept. 22, 1951                           11 Sheets-Sheet 8

Inventor
Robert F. Broussard
By Chenney & Canning
Attorneys

Aug. 10, 1954     R. F. BROUSSARD     2,685,953
PARKING METER

Filed Sept. 22, 1951     11 Sheets-Sheet 9

Inventor
Robert F. Broussard

Aug. 10, 1954   R. F. BROUSSARD   2,685,953
PARKING METER
Filed Sept. 22, 1951   11 Sheets-Sheet 10

Inventor
Robert F. Broussard
by *Channing & Channing*
Attorneys

Aug. 10, 1954  R. F. BROUSSARD  2,685,953
PARKING METER

Filed Sept. 22, 1951  11 Sheets-Sheet 11

Inventor
Robert F. Broussard by Banning & Banning
Attorneys

Patented Aug. 10, 1954

2,685,953

UNITED STATES PATENT OFFICE 2,685,953

PARKING METER

Robert F. Broussard, Glendale, Calif., assignor to Miller Meters, Inc., Chicago, Ill., a corporation of Illinois Application September 22, 1951, Serial No. 247,881

7 Claims. (Cl. 194—72)

This invention relates to coin-controlled devices and more particularly to a parking meter having a coin mechanism which utilizes a manual coin inductor in conjunction with a movable coin carrier and other associated parts as hereinafter specified, all assembled within a unitary supporting structure which is adapted for securement in a fixed position within a protecting housing therefor.

This invention is an improvement on the parking meter shown and described in the copending applications of Robert F. Broussard et al., Serial Nos. 142,041 and 142,042 filed on February 2, 1950.

This invention incorporates the safeguards serving to prevent vandalism and illicit practices designed to obtain parking time without payment of the prescribed tolls which are described and claimed in said copending applications, and the features of this invention are directed largely to improvement in the mechanical movement of the parking meter apparatus so as to provide a more efficient mechanical arrangement of the device.

Parking meters broadly can be divided into two separate groups, namely spring operated and electric operated. The latter form of meter requires for its installation that electrical conduit be laid in the street or sidewalk to supply electrical power to operate the various mechanisms of the meter, and hence the electrical form has lacked popularity because of the expense necessarily entailed in initially installing the meters.

With the spring-operated parking meters, it is only necessary to mount the meter on a suitable housing post at the desired location in order to complete the installation.

The spring-type parking meters may themselves be broadly classified into two groups, namely the "one-motion" and "two-motion" parking meter. The two-motion meter is, as its name implies, one which requires that two separate operations be performed in order to operate the meter. The first of these two motions is that of winding the spring of the timing device to supply power through the time regulating mechanism which serves at the end of the purchased time to cause the display of a signal of some sort indicating that the purchased time has expired. The second of the two motions is the setting of the time indicating device to indicate the quantity of time purchased while simultaneously withdrawing from view the violation signal device.

In one form of two-motion parking meter the motorist supplies both motions. In this form, a coin is inserted which sets the time indicator and then the motorist must supply power to the timing mechanism by winding a handle or moving some other manually operated device. In another form of two-motion parking meter, the timing mechanism is wound by a municipal employee whose duty it is to make the rounds of all parking meters, insert a crank and wind the mechanism of each meter. Thus, in this latter form, one of the motions is performed by the employee and the second motion is performed by the motorist when he inserts a coin in the meter.

Both forms of two-motion parking meters are subject to numerous objections. If, in the first form, the motorist fails to wind the timing mechanism, the meter will show a violation long prior to the expiration of the purchased time and he may thereupon receive an undeserved traffic ticket for a parking violation. In the second form of two-motion meter, the employee may fail to wind the mechanism before it has completely run down or may overwind the mechanism so as to cause meter failure. In either instance, the meter fails to give the motorist the benefit of the parking time he has purchased.

Such failures of meters to operate properly in response to the insertion of a coin by a motorist is, of course, extremely irritating to the motorist and may result in such public indignation as to cause the removal of the parking meter entirely.

The one-motion parking meter exemplified in the applications hereinbefore referred to and in this application is one in which a single motion, such as the insertion of a coin by a motorist, not only sets the indicating mechanism but also supplies power to the timing mechanism. With this type of meter it is not necessary that the motorist separately wind the timing mechanism nor is it necessary to engage a serviceman periodically to wind the meters. Thus, with a one-motion type of meter, the insertion of a coin insures that the timing mechanism is wound and insures proper operation of the meter without reliance upon the motorist's memory to wind the timing mechanism or without reliance upon a municipal employee properly to have serviced the meter beforehand. For this reason, the one-motion type parking meter may be relied upon to operate properly at all times and leaves no opportunity for mental lapse either on the part of the motorist or the serviceman to cause unwarranted traffic violation tickets to be issued.

One of the features of this invention is the provision of a new and improved means for supplying power to the mechanism for setting the time indicating device and withdrawing the violation signal and to the timing mechanism which times out the purchased parking time. A further feature of this invention is the provision of means whereby the insertion of a coin by a motorist entails the movement of a movable member wherein the manual power necessary to move the member is divided by the mechanism and transmitted separately to the time indicating apparatus and to the timing apparatus.

A further feature of the invention is the provision of the parking meter having a first mechanism including a spring for setting the time indicator and withdrawing the violation signal from view and a second mechanism also including a spring for timing out the purchased parking time and to provide such a meter with means whereby the power incident to the insertion of a coin into the meter is divided between both mechanisms to supply power to each of the springs therein.

A further feature of the invention is the provision, in a parking meter of the type described in the preceding paragraph, of a member which must be moved by the motorist as a coin is inserted and to provide such a movable member with means for dividing the power supplied to it and delivering such power in two separate parts to the indicating mechanism and to the timing mechanism.

A further feature of this invention is the provision, in a parking meter of the type described in the preceding paragraphs, of a slip clutch connection between the timing mechanism and the indicator pointer so that the pointer may be moved by the indicating mechanism without affecting the timing mechanism or winding the spring associated therewith. A further feature of the invention is the fact that the provision of the slip clutch permits adjustment of the pointer by a serviceman even while the meter is running, in the event that the pointer should become misaligned with the scale associated therewith, so that in all events the proper time interval is indicated by the insertion of a coin.

Other and further features and objects of the invention will be readily apparent from the following description and drawings, in which:

Fig. 1 is a vertical sectional view of the parking meter housing together with a front elevational view of the self-contained parking meter mechanism in its normal position within the housing;

Fig. 2 is a sectional view, taken at line 2—2 of Fig. 1, showing in elevation the locating plate which serves, in cooperation with other parts, to fix the position of the meter mechanism unit within the housing and to aid in securing the same in place, subject to intentional withdrawal;

Fig. 3 is a plan view on a reduced scale, taken at line 3—3 of Fig. 1, and showing more particularly the position of the meter mechanism within the housing and the vertical grooves or guide-slots designed to receive the locating plate;

Fig. 4 is a perspective view of a removable spring metal keeper which normally functions, conjointly with the locating plate of Fig. 5, to locate and secure the meter mechanism in place within the housing;

Fig. 5 is a perspective view of the locating plate for the meter mechanism;

Fig. 6 is a small scale front elevation of the meter mechanism, exclusive of the housing;

Fig. 7 is an enlarged side elevation of the meter mechanism as viewed from the left of Fig. 6;

Fig. 8 is an enlarged side elevation of the meter mechanism as viewed from the right of Fig. 6 (being the reverse of Fig. 7), the manually operable coin inductor being omitted from this view in order to expose other parts located at the rear thereof;

Fig. 9 is an enlarged section, taken on line 9—9 of Fig. 6;

Fig. 10 is an exploded view showing the framework of the meter mechanism and the graduated time scales or dial plates, together with a few mechanical parts including the violation flag and the manually operable coin inductor by means of which the meter is manually set for operation coincidentally with the deposit of a coin;

Figures 11, 11A, 12:
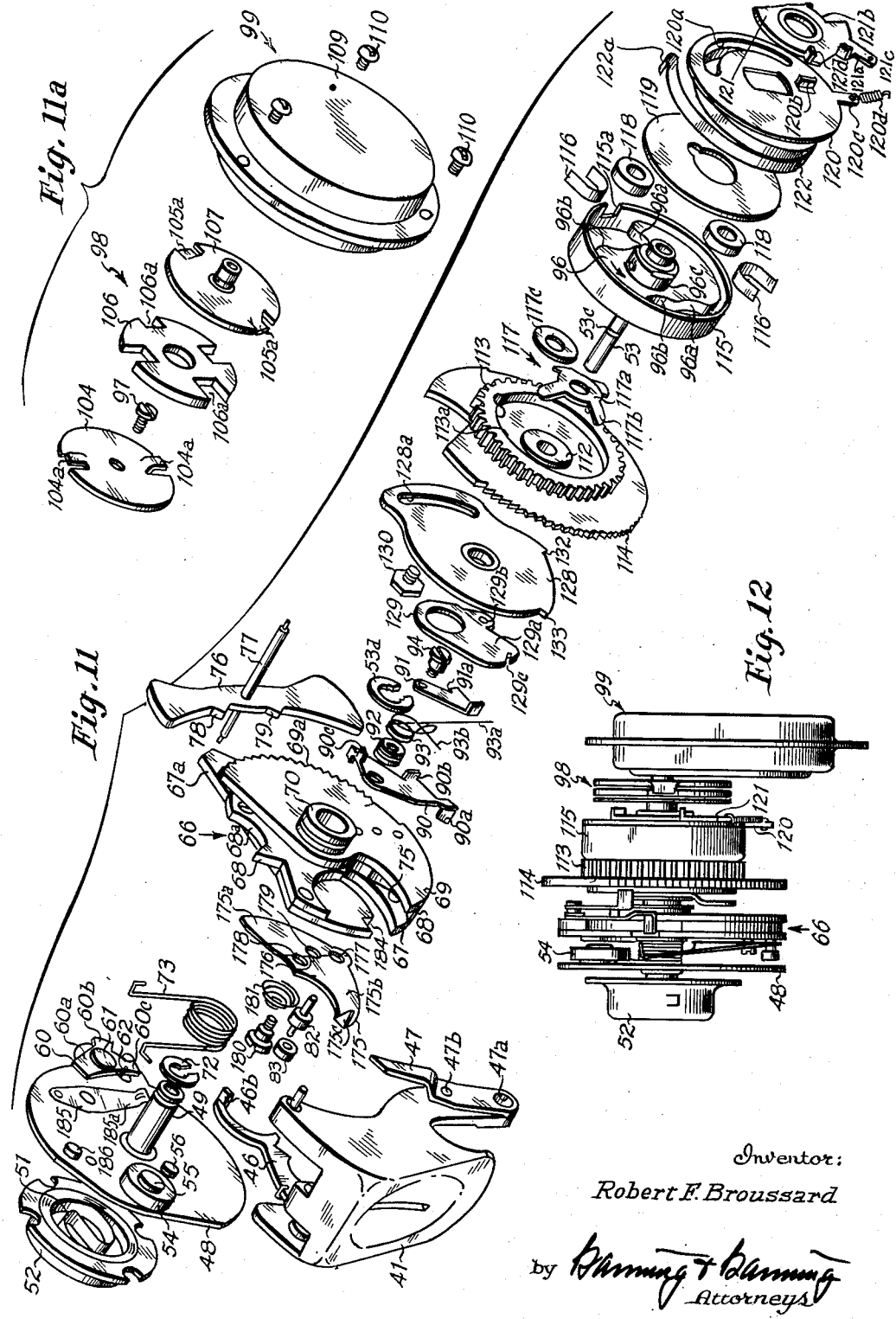
Figure 13:
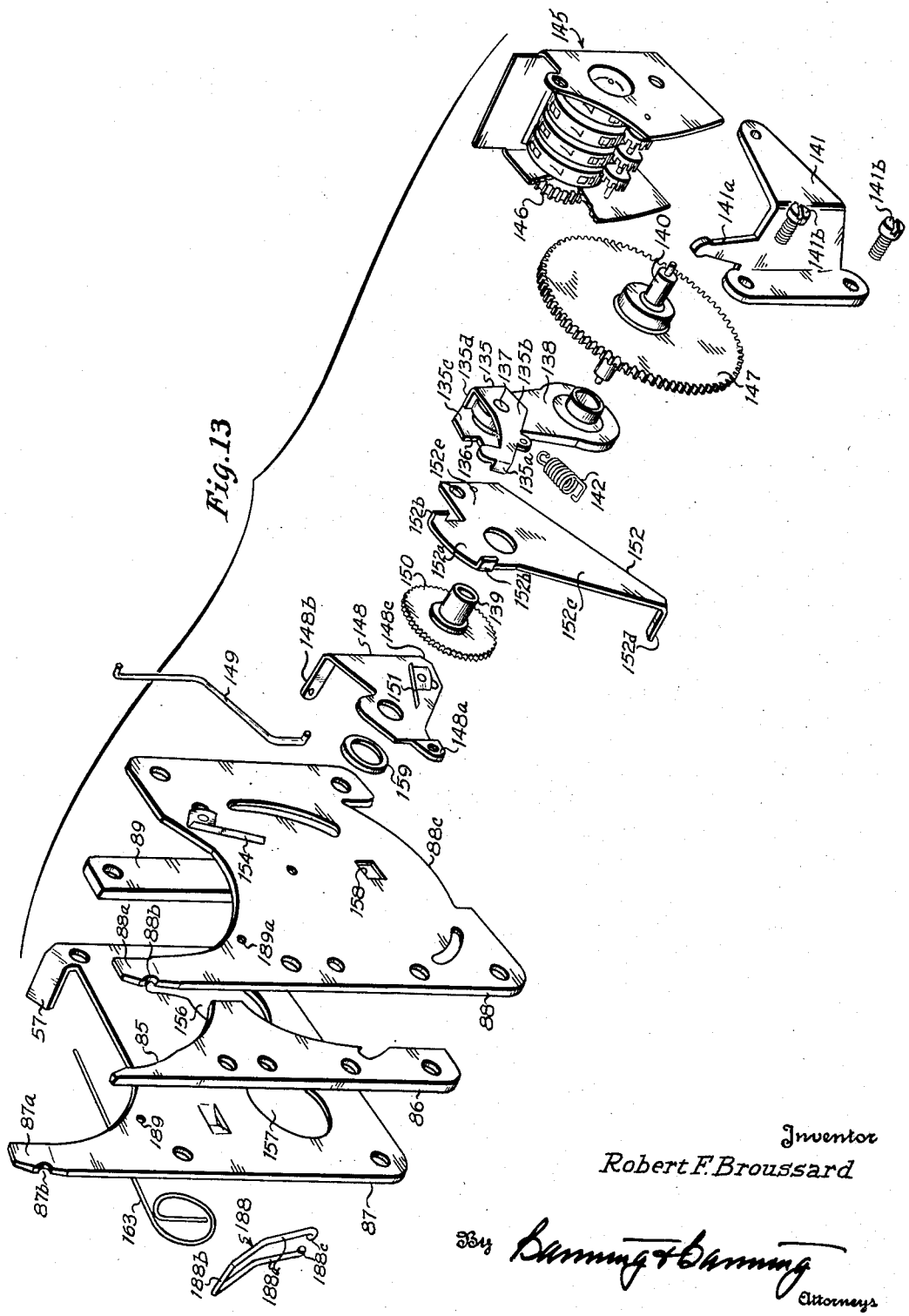
Figure 14:
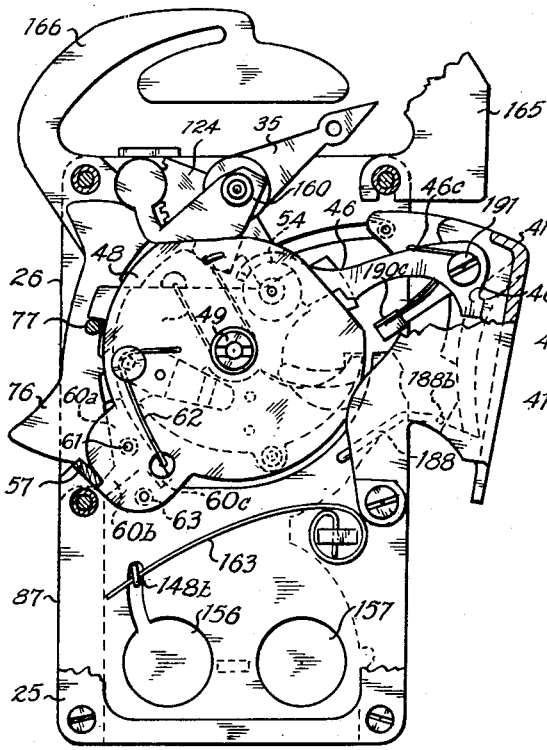
Figure 15:
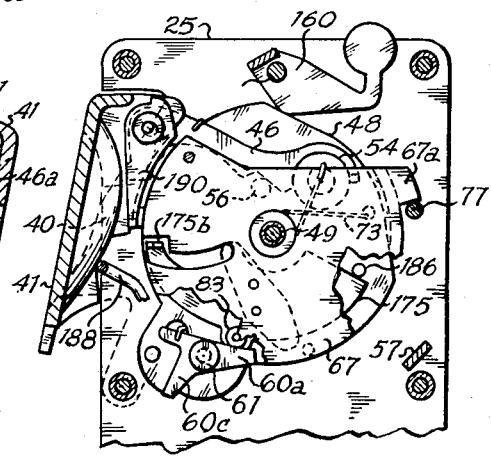
Figure 16:
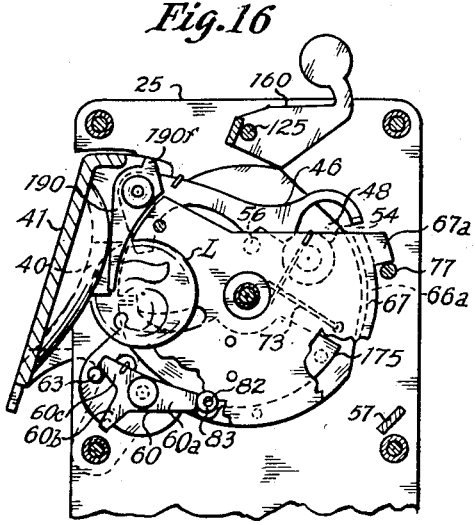
Figure 17:
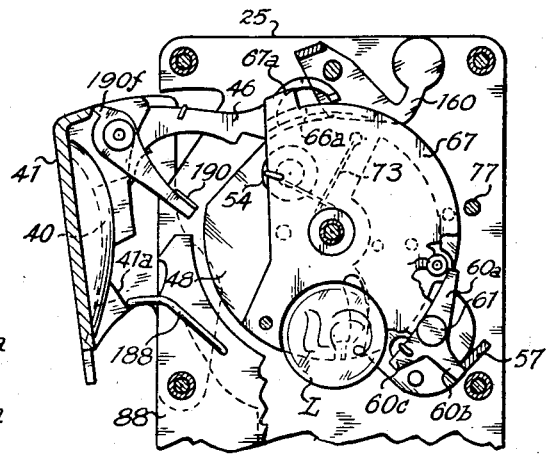
Figure 19:
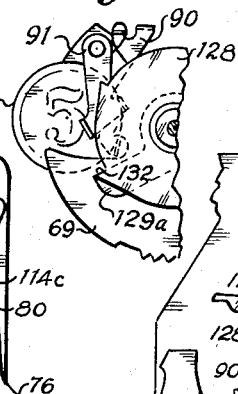
Figure 20:
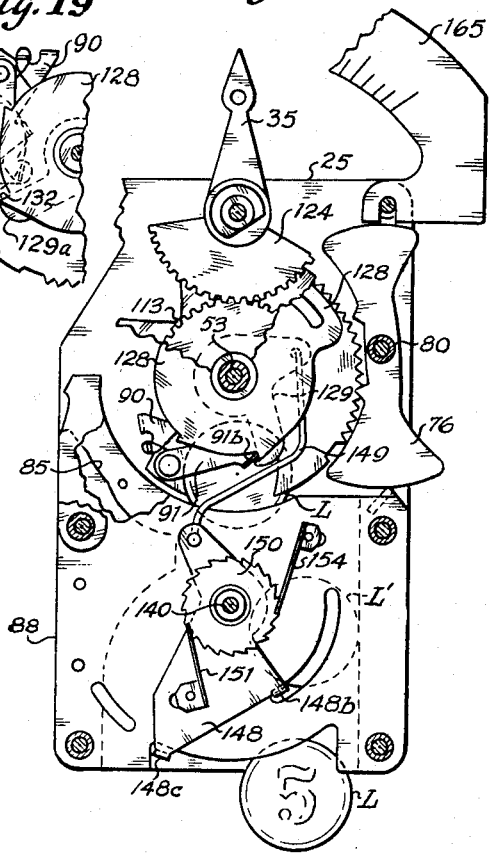
Figure 21:
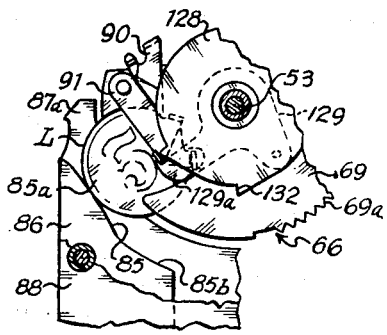
Figure 22:
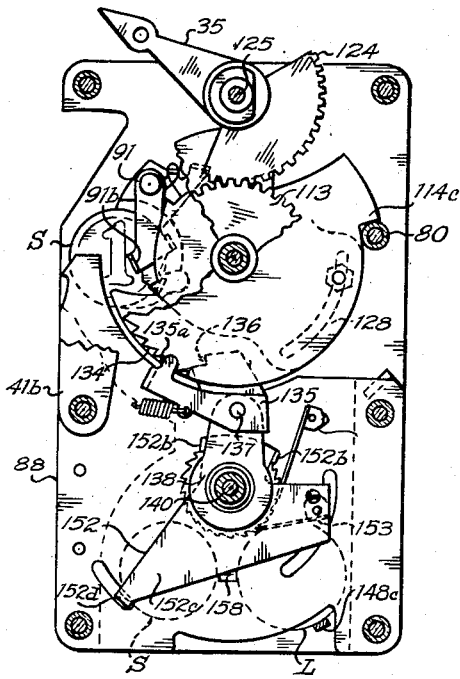
Figure 24:
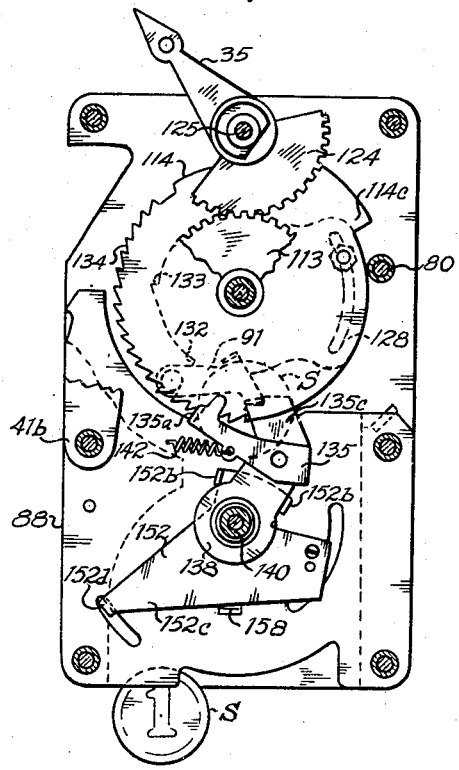
Figure 23:
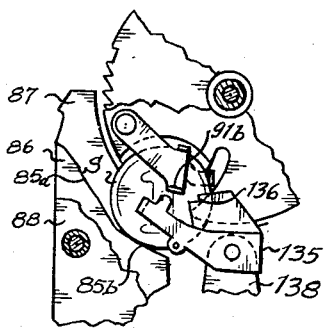
Figure 24A:
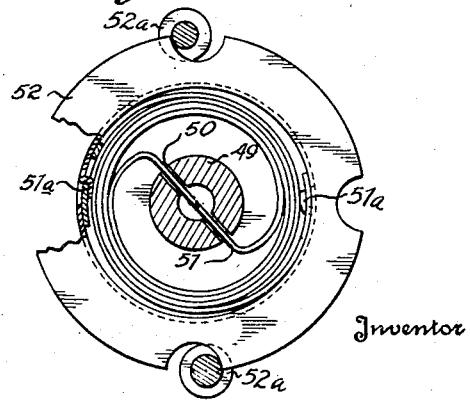
Figure 25:
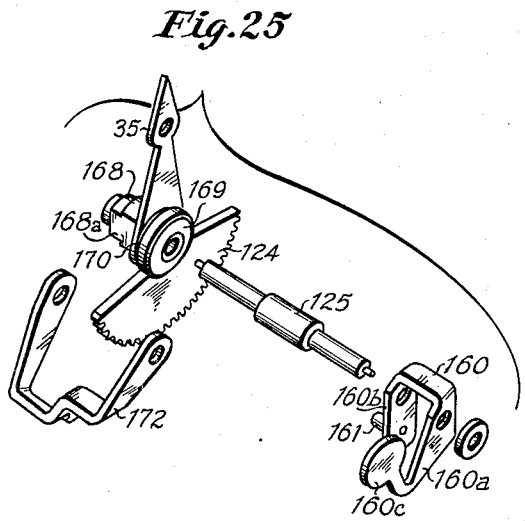

Figs. 11 and 11a, taken together, constitute an exploded view of the mechanical components of the meter mechanism which, for the most part, are located on or immediately associated with what will be referred to as the major axis, Fig. 11a being a continuation of Fig. 11;

Fig. 12 is an assembly of the parts shown in Figs. 11 and 11a;

Fig. 13 is an exploded view showing, in perspective, a group of parts which for the most part are located at a lower level than those shown in Figs. 11, 11a and 12, and comprising the plates forming the coin track, the coin-release mechanism, the coin counter and the pawl which advances the time-setting plate in response to a minor coin;

Fig. 14 is a sectional view, taken at line 14—14 of Fig. 7, showing the several exhibited parts in their normal positions;

Fig. 15 is a sectional view, taken at line 15—15 of Fig. 8, showing the manually operated coin inductor in a partially depressed position and the power plate in a corresponding position;

Fig. 16 is a view similar to Fig. 15, showing the coin inductor in fully depressed position and the power plate in its extreme off-normal position wherein it is latched to the coin carrier and about to return to normal position, thus rotating the coin carrier from coin-receiving to the coin discharge position;

Fig. 17 is a view similar to Figs. 15 and 16, showing the manually operated coin inductor and the power plate restored to normal position and illustrating how the latch is de-actuated to allow the coin carrier to return to its normal position, a major coin being shown in process of being discharged from the coin carrier into the coin chute;

Figs. 18–21 inclusive are views designed to illustrate progressively the manner in which the timing mechanism is set for operation in response to a major coin, Fig. 21 being intended to illustrate a special situation which often arises where the meter is adapted to afford two major units of parking time in exchange for two major coins, and where the second major coin is inserted in the coin slot just prior to expiration of one such unit of time;

Figs. 22–24 inclusive are views designed to illustrate progressively the manner in which the timing mechanism is set for operation in response to a minor coin, Fig. 23 being intended to illustrate how the difference in diameter between a major and a minor coin is accentuated by altering the contour of the coin track;

Fig. 24a is a detail in section, taken on line 24a—24a of Fig. 9;

Fig. 25 is an exploded view showing in perspective the time-indicating pointer and certain associated parts, together with the trouble flag and a yoke which serves as a coupling medium between the trouble flag and the violation flag;

Figs. 26-30 inclusive are a series of semi-diagrammatic views illustrating progressively the operation of the trouble flag and the violation flag; and Figs. 31-36 inclusive are detail views showing the timing spring and associated mechanism, together with the means for supplying power to such timing spring.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

*Preliminary explanation of the subject parking meter and statement of invention*

The specific parking meter chosen for illustration and description is susceptible of operation with coins of two different denominations, viz., coins of two different diameters, as for example nickels and pennies. The coin of larger diameter is referred to herein as a "major" coin whereas the coin of small diameter is referred to as a "minor" coin. The meter is designed to receive a maximum of two major coins, or one major coin and five minor coins, or ten minor coins, and to afford proportionate parking time; but none of the novel features of the invention is limited in its utility to meters answering to the above description.

The entire meter installation herein chosen by way of example comprises a metal housing mounted on a hollow post within which is a removable coin box, and a self-contained unitary meter mechanism mounted for easy removal within the housing. The present application is concerned with the meter mechanism per se.

The major components of the illustrated meter mechanism itself are:

A. A first power mechanism including a rotary power plate, a power spring rotationally biasing the power plate toward a normal position, a latch carried by the power plate and operative to releasably couple the power plate to the coin carrier, a second power mechanism including a spring for driving a timing device to time out purchased parking time, a manually operable element for energizing both power mechanisms individually and simultaneously setting the meter, and constituting a coin inductor which may take the form of a pivoted arm or push plate having a coin slit through which coins are admitted to the coin carrier, and a pair of pusher links each hinged to the manually operable element one of which is operative upon depression of said element to rotate the power plate from its normal position to an alternate position wherein the power plate is latched to the coin carrier and the other of which is operative upon depression of said element for supplying power to the timing spring.

B. A coin carrier designed to receive coins, one at a time, as they are passed through the coin slit of the coin inductor and which is rotatable by the power mechanism from a normal coin-receiving position to an alternate coin-discharge position, and mounting a spring-biased coin gauge which is movable in response to a major coin to a predetermined position in which it is effective upon rotation of the coin carrier to set the time indicator for a period corresponding to the value of the major coin (usually one hour) and movable in response to a minor coin to a different predetermined position in which it is effective upon rotation of the coin carrier to set the time indicator for a shorter period proportionate to the value of the minor coin.

C. Time indicating means in the form of a graduated scale on a dial plate, and a time indicator or pointer cooperating with the scale and spring-biased toward the zero scale indicia, but movable along the scale in response to coin-controlled actuation of the meter to an extent corresponding to the value of the deposited coin.

D. A timing regulator or brake in the form of a gear train and escapement which functions to retard the return movement of the time indicator.

E. A coin counting mechanism which registers in accordance with the value of each deposited coin and thus provides a cumulative record of receipts.

F. A coin release mechanism which operates to arrest each coin in registration with an observation window and thereafter releases the arrested coin when another coin of the same denomination is inserted in the meter.

To set the meter for obtainment of parking time, the motorist inserts either a major coin or a minor coin in the coin slit and simultaneously exerts pressure against the manually operable coin inductor in which the coin slit is formed; and he may, if he desires, insert two major coins or any number of minor coins up to the value of two major coins and thus obtain the maximum allowable parking time or any desired proportionate part thereof. He must, however, actuate the coin inductor after each insertion of a single coin because the coin carrier is not designed to receive more than one coin at a time.

When, after inserting a proper coin, the motorist depresses the manually operable inductor plate, he causes the power plate to rotate from a normal at-rest position to an alternate position and at the same time energizes a power spring which functions to return the power plate to its normal position. When the power plate reaches its alternate position, a latch carried thereby engages the coin carrier and couples the same to the power plate so that, upon the return rotation of the power plate under the impetus of the power spring, it carries with it the coin carrier and thus rotates the coin carrier from its coin-receiving position to the coin-discharge position. As soon as the coin carrier reaches the coin-discharge position, the coin-carrier is released and a biasing spring connected thereto returns the coin carrier to its coin-receiving position where it is ready to receive another coin. During rotation of the coin carrier away from its coin-receiving position, it carries with it either a major or minor coin which is held in place by a stationary coin track along which the coin rolls or slides; and the coin gauge is at the same time held by the coin in an off normal position corresponding to the diameter of the coin. If the coin is a major one, the coin gauge is so positioned thereby that it engages a tooth on a time control plate and is thereby effective to move the time indicator through a major angular distance in response to rotation of the coin carrier while the latter is moving from coin-receiving to coin-discharge position. If the coin is a minor one, the coin gauge is so positioned thereby that it does not engage the time control plate tooth but, instead, engages and actuates a pawl which, in turn, engages and rotates a ratchet wheel and thereby effects rotation of the time indicator to an extent corresponding to the value of a minor coin. In either event, the time indicator is moved away from its zero position. A second spring is provided for restoring the time indicator to its zero position. This latter spring, however, is connected to an escapement or other timing mechanism to delay the operation thereof for a time equal to the purchased parking time. The time indicator, when moved away from its zero position by the coin gauge, as just described, does not affect the timing mechanism, which is connected thereto through the medium of a slip clutch to permit such initial movement of the time indicator.

While the illustrated meter mechanism is designed to afford a maximum of two major units of parking time (usually two hours) in exchange for two major coins (nickels) or ten minor coins (pennies), it can easily be converted so that it is capable of being set to afford a maximum of one major unit of parking time. The duration of one major unit of time ordinarily is one hour, but that is determined by the time regulator which can be designed either to increase or decrease the interval required for the time indicator to scan the graduated scale.

It will be noted that in the one-motion parking meter described in the copending applications previously referred to, the power plate and coin carrier during their rotation served to wind the spring associated with the timing mechanism. Thus the entire power was supplied substantially along a single line. Because of this fact, it was necessary that the various parts be made capable not only of receiving and supplying power to the mechanism immediately associated therewith but that they be further capable of receiving power and transmitting that power to a second, namely the timing, mechanism. Some difficulties have been experienced because of this added requirement for strength. Another feature of the invention is the provision of a parking meter in which each of the mechanisms receives and transmits only that portion of the power applied to the mechanism as a whole which it needs to perform its functions. Thus in the present meter, the mechanism associated with the coin carrier and the means for initially setting the time indicator is powered by a spring which stores power from the movement of the inductor plate sufficient only to operate that portion of the mechanism while the spring which moves the time indicator to zero through the timing or escapement mechanism receives its power directly from the inductor plate and not through the first mentioned mechanism.

*General description with reference to the drawings*

The parking meter installation herein disclosed comprises a housing H supported on a suitable post (not shown), a meter mechanism M, and a removable coin box B which is positioned below the meter mechanism. A coin-receiving slot is provided in the coin box at its upper end, in register with a coin-discharge opening in the bottom of the meter mechanism, to receive therefrom both major and minor coins as they descend by gravity.

The housing H comprises a hollow body 10 which preferably is an aluminum casting, and a removable cover 12 including a transparent hemispherical dome 13, preferably plastic, and a metal retainer 14 which serves to hold the dome 13 in place and is threaded internally to detachably engage the housing body. The arched portion 14a of the dome 13 is a relatively narrow bridge and does not enclose the dome or interfere with essential visibility therethrough of the graduated time scale and indicator, nor of the trouble and violation flags. An annular gasket 15 is held against the peripheral edge of the dome 13 by means of a ring 16 which is threaded into the retainer 14, thus rendering the housing weathertight.

The meter mechanism M is a self-contained unit which can be withdrawn bodily from the housing H, after first removing the dome 13, and it is appropriately located and removably held in place within the housing by means of a locating or positioning plate 18 (see Fig. 5), and a keeper 20 (see Fig. 4). The locating plate 18 serves, among other purposes, in cooperation with the keeper 20, to so position the meter mechanism that a manually operable element, constituting a coin inductor, in which is included a coin-receiving slit, registers with an opening 22 through the wall of the housing body 10, and at the same time functions to align the coin-discharge opening in the bottom of the meter mechanism with the coin-receiving opening in the top of the coin box B, the object being to expedite servicing of the meters by making it possible for authorized employees to remove and replace the meter mechanisms quickly and without exercise of special skill. A circular plate 23 supported on the frame of the meter mechanism M serves to conceal from view the apparatus therebelow, and provides a conspicuous surface for display of relevant parking regulations such as the hours during which parking tolls are required to be paid, and the prevailing exceptions.

All the component parts of the meter mechanism are supported, directly or indirectly, by an articulated framework comprising primarily three laterally spaced plates 25, 26 and 27, a number of tubular spacers 28, a number of tie bolts 29 which pass through the plates and the spacers, and a number of screws 30 which are threaded into the ends of the tie bolts 29. The exploded perspective view of Fig. 10 shows the configurations of the three frame plates and serves, in conjunction with Figs. 7–9, to clarify the construction of the framework. For convenience, we may refer to the plate 25 as the front plate, to the plate 27 as the back plate, and to the plate 26 as the intermediate plate.

Unused parking time is shown by a time indicator in the form of a pointer 35 having an axis of rotation at 36 (see Figs. 1 and 6), and a graduated scale 37 which, for present purposes, may be considered as calibrated for two major units of time of one hour each. As viewed in Figs. 1 and 6, the zero indicia is at the right-hand end of the scale, and the indicator 35 moves counterclockwise when the meter is being set, and clockwise when the meter is running down. The opposite holds true when the meter is viewed from the other side. Setting of the meter is accomplished by inserting either a major or minor coin in the coin-receiving slit 40 and depressing the manually operable coin inductor 41 in which the coin-receiving slit 40 is formed.

The coin inductor 41 which may take the form of a push plate and is sometimes so referred to hereinafter, is a cast metal part comprising a finger-engaging bridge portion 41a interconnecting two laterally spaced parallel arms 41b and 41c each of which is apertured at its lower extremity to engage a fulcrum. The fulcrum to which the arm 41b is connected is one of the tubular spacers 28; and the fulcrum to which the arm 41c is connected is a screw 42 which latter is one of the group which includes the screws 30 but has an extra long head to afford an adequate heavy surface for the arm 41c (see Figs. 8 and 10). The push plate 41 is biased outwardly by a spring 43 and normally assumes the outward position in which it is shown in Figs. 1 and 6. A pin 44 (see Fig. 10), projecting laterally from one side of the coin inductor functions to limit the reciprocatory movement thereof in both directions, and for that purpose is extended through an arcuate slot 45 in the plate 26 (see Fig. 10).

A first pusher link 46 is pivotally connected at one end to a lug 41d which forms an integral part of the coin inductor 41 (see Figs. 10 and 14), and normally assumes the approximately horizontal position in which it is shown in Fig. 14. This links serves as a power transmitting medium between the coin inductor 41 and a so-called power mechanism, which latter is energized in response to each inward movement of the coin inductor and thereupon utilizes its stored energy to rotate a coin carrier, which, in turn, is effective to set an indicator proportionately to the value of the deposited coin. A second pusher link 47 is provided with a hole 47a at one end aligned with the hole in the side 41b and is secured to the pusher plate by means of a pin 47b so as to be firmly but swingably attached to the push plate. This second pusher link serves as a power transmitting medium between the coin inductor 41 and a second power mechanism for operating the timing means of the device.

The power mechanism first mentioned in the preceding paragraph includes a power plate 48 (see especially Figs. 9 and 11) affixed to a sleeve 49 with which it is rotatable and which is diametrically slotted at 50 (see Figs. 9 and 24a) to engage the medial portion of a ribbon power spring 51 where it is reversed and wound into coils whose opposite ends are slotted for engagement by hooks 51a which are outstruck from a sheet metal housing 52 detachably connected with capacity for rotative adjustment to the outer surface of the front frame plate 25 with the aid rivets 52a. A spring so formed is doubly effective for supplying the power desired for operation of the associated mechanism. The sleeve 49 is journaled in an opening in the plate 25 and, in turn, provides a bearing for a shaft 53 the function of which will later be explained.

A steel roller 54 is carried by a pin 55 which, in turn, is secured to one face of the power plate 48 at a point radially remote from its axis of rotation and is positioned for engagement by the free end of the pusher link 46 upon depression of the coin inductor 41. Adjacent its free end, the pusher link is provided with a semi-circular portion shaped to conform to the periphery of the roller 54 (see Fig. 14). The link terminates in an integrally formed lip 46f adapted to be contacted by a segmental cam plate 66a fixed to the coin carrier mechanism hereinafter to be described. The link 46 is also provided with a tailpiece 46a which normally bears against a boss on the coin inductor 41 so as to be held in the position of Fig. 14 wherein it is adapted to engage the roller 54. A spring 46c serves to bias the pusher link 46 downwardly toward the normal position in which it is shown in Fig. 14. As the coin inductor 41 is pressed inwardly, the pusher link 46 engages the roller 54 and thus rotates the power plate 48 and the sleeve 49 through a predetermined distance, thereby energizing the power spring 51 so that when the power plate is released it will return to its normal position under the impetus of this spring. The normal position of the power plate is determined by a stop 57 (see Fig. 14) which normally engages a shoulder on the power plate.

One of the strange phenomenon associated with parking meters is the fact that the motoring public generally does not approve of meters and looks upon them as legitimate objects of sabotage. An otherwise honest motorist apparently feels no qualms of consciousness as he attempts to obtain parking time by the use of slugs, nail files or other devices and many persons have figured out various and ingenious schemes for manipulating the parking meter illegitimately to obtain parking time. One of the favorite schemes is to press inwardly on the coin receiving member until it engages the operating mechanism of the meter but not until it reaches its release point. By so doing and by subsequently releasing the inward pressure, the movable plate or coin inductor remains locked in an inward position. Thus, any time showing on the meter will not run out and the motorist receives an indefinitely prolonged parking period. Another favorite device is to insert a minor coin and move the coin inductor inwardly until it catches the ratchet mechanism which sets the pointer. By careful manipulation the culprit can "seesaw" the coin inductor back and forth, with each oscillation of the inductor serving to move the pointer the period allotted to a minor coin. Thus if such period be twelve minutes, oscillatory movement by the coin inductor a half a dozen times will cause the indicator to indicate an hour and twelve minutes of time as having been purchased. One of the features of the present invention is the particular construction of the link 46 and the cam plate 66a which serve to prevent such illicit practices. In the event an attempt should be made to lock the present meter or to "seesaw" the inductor 41 in the manner just described such movement of the inductor causes rotational movement of the coin carrier to which the cam plate 66a is attached. The cam plate 66a thereby contacts the lip 46f lifting the link out of contact with the roller 54 thus allowing the power plate 48 to return to normal position. This return movement of the power plate moves the coin carrier to coin discharge position and allows the meter to return to its initial position.

A latch 60 (see Fig. 11), carried by and rotatable on a pivot 61 secured to the power plate 48, is biased by a spring 62 in the clockwise direction as viewed in Fig. 14, and in the counter-clockwise direction as viewed in Figs. 15–17 inclusive. This latch includes three radially projecting arms 60a, 60b and 60c (see Fig. 11). When the power plate is in its normal position (see Fig. 14) the arm 60b is pressed by the spring 62 against the stop 57; when, however, the power plate is moved away from the normal position of Fig. 14, the latch 60 is rotated by the spring 62 until the arm 60c is brought to bear against a stop pin 63 carried by and projecting laterally from the power plate. The function of the latch 60 will be explained in connection with a coin carrier 66 now to be considered.

The coin carrier is a self-contained sub-assembly and is shown most clearly, as an entirety, in Fig. 11. Many of the parts included in the coin carrier sub-assembly are separately shown in Fig. 11, it being impossible to illustrate clearly the entire assembled unit in a perspective view. The body of the coin carrier is identified as a whole by the reference numeral 66, and it consists principally of two outer plates 67 and 69 and an intermediate plate 68 fixedly secured together and rigidly mounted on a bushing 70 which is rotatable on the sleeve 49 forming part of the power mechanism (see Figs. 9 and 11). The sleeve 49 has an annular groove at its inner end for reception of a snap-on washer 72 which serves to hold the coin carrier in place on the sleeve 49. A coiled torsion spring 73 (see Fig. 11) is mounted on the bushing 70 (see Fig. 9), and has its two ends connected respectively to the power plate and to the plate 67 of the coin carrier. This spring serves to bias the coin carrier toward its normal coin-receiving position and consequently functions to return the coin carrier to that position after it has been rotated by the power mechanism to the coin-discharge position and then released. The three coin carrier plates 67, 68 and 69 are so contoured that they form conjointly a coin-receiving pocket 75 designed to receive both major and minor coins, one at a time. This pocket opens peripherally of the carrier at a location which registers with the coin-receiving slit 40 in the coin inductor, i. e., the push plate 41, when the coin carrier is in its normal coin-receiving position (see Figs. 11 and 14–16 inclusive).

If the coin carrier were unrestrained it would rotate under the impetus of the power spring 51 and, in the opposite direction, under the impetus of its restoring spring 73 (see Fig. 11) at excessively high speeds such that there would be no release of a minor coin from a rocker arm, and a faulty operation of a counter, both to be hereinafter described in detail. For these reasons means have been provided for retarding the rotation of the coin carrier in both directions. This consists of a somewhat massive rocker 76 mounted on a rocker-shaft 77 and provided with two escapement pallets 78 and 79 which engage a series of V-shaped teeth 69a on the periphery of the carrier plate 69 (see Fig. 11). The two ends of the rocker-shaft 77 are reduced to form trunnions which are journaled in openings provided therefor in the front and intermediate frame plates 25 and 26 (see Fig. 7). As the carrier rotates, the rocker 76 is oscillated by the alternate action of the teeth 69a on the pallets 78 and 79. The rotational inertia of the rocker 76 determines its oscillation period with respect to any assumed torsional force acting on the coin carrier; hence the speed of rotation of the coin carrier can be increased or decreased by proportionately increasing or decreasing the rotational inertia of the rocker 76.

The carrier plate 67 has a radially projecting arm 67a (see Fig. 11) which normally rests against the rocker shaft 77. A thimble 80 is attached to and projects laterally from the frame plate 26 (see Fig. 7), and is concentric with the rocker shaft 77. The arm 67a constitutes a stop means which determines the normal rotational position of the coin carrier wherein it is adapted to receive in its coin pocket 75 a coin which is passed thereto through the coin-receiving slit 40 of the inductor 41.

The carrier plate 67 has a laterally projecting pin 82 on which is mounted a small roller 83 which is in the path of the free end of the arm 60a of the latch 60 when the latter is so biased by the spring 62 (see Fig. 14) that its arm 60c rests against the stop pin 63 (see Fig. 16). When the power plate is being rotated away from its normal position of Fig. 14 toward the alternative rotative position shown in Fig. 15, the latch 60 is deflected rotationally, the camming action of the roller 83 bearing against the arm 60a, thus allowing the latch to escape said roller. Just before the power plate is released by disengagement of the roller 54 from the pusher link 46, and is about to return to its normal position under the impetus of the power spring 51, the free end of the latch arm 60a clears the roller 83 whereupon the latch 60 is rotated by its biasing spring 62 to a position wherein the arm 60c bears against the stop pin 63. As shown in Fig. 16, the free end of the arm 60a is in a position to drivably engage the roller 83, thus coupling the coin carrier to the power plate. Immediately after the latch 60 has assumed the position of Fig. 16, the power plate is released by an over-center movement of the pusher link 46 which is brought about by the action thereon of the pin 56 (see Fig. 15). During the return movement of the power plate the coin carrier is rotated bodily from its normal coin-receiving position to its alternate coin-discharge position as illustrated in Fig. 17. This movement of the coin carrier is effected by the power mechanism by virtue of the roller 83 being drivably engaged by the latch 60. While the coin carrier is being rotated from its normal coin-receiving position to its alternate coin-discharge position the power plate is rotating from its alternate position to the normal position thereof shown in Fig. 14. Upon near completion of the return movement of the power plate, the latch arm 60b strikes the stop 57, and the latch is thus rotated in a direction to release the roller 83, whereupon the coin carrier returns to its normal position under the impetus of its restoring spring 73 (see Fig. 17).

The coin in the pocket 75 of the coin carrier must be held in place while the carrier is rotating from its normal coin-receiving position to its alternate coin-discharge position, and yet in such a way that it will be quickly ejected when the coin carrier arrives at the coin-discharge position. Moreover the coin must be held at a predetermined distance from the center of rotation of the coin carrier, i. e., the major axis of the meter, so that it will, in turn, hold the coin gauge (to be hereafter described in detail) in a proper position so that the time indicator will be moved to an extent corresponding either to a major coin or a minor coin, depending upon which kind of coin has been deposited. To these ends there is provided a coin track partially encircling the coin carrier and constituting a curved coin-supporting surface 85 in line with the coin pocket 75 in the coin carrier body 66 and formed on one edge of a plate 86 (see Fig. 13) which is held between two additional plates 87 and 88 which together provide coin guide walls to prevent excessive lateral displacement of the coins as they proceed along the coin track. The three plates 86–88 are supported on some of the tie bolts 29 and jointly held in position laterally by certain of the tubular spacers 28. As shown in several of the figures (for example Fig. 21) the coin track 85 is spaced at some distance radially from the periphery of the coin carrier and is effective to hold the coin only partially extended into the coin carrier pocket.

The coin gauge

Referring now more particularly to Figs. 11 and 18–24, attention is directed to the so-called coin gauge whose primary function is to differentiate between major and minor coins and thus determine the extent to which the time indicator shall be rotatively displaced in response to each coin insertion and accompanying actuation of the push plate 41. The coin gauge consists of an assemblage comprising two arms (see Fig. 11) which are identified respectively by the reference numerals 90 and 91. The entire assemblage includes, additionally, a spool-like spacer 92 around which is coiled a wire spring 93, and a pin 94 which functions as a pivot and extends through apertures in each of the two arms and through the bore of the spacer 92. This pin is formed with an end portion of reduced diameter which passes through an opening 95 in the carrier body plates 67 and 68 and is staked at the end to effect a firm attachment to the carrier body. An edgewise view of the assembled coin gauge is shown in Fig. 8.

Figure 18:
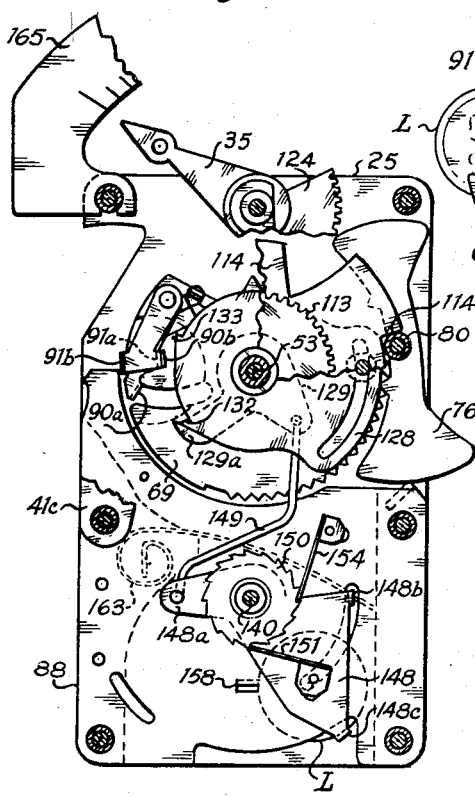

The arm 90 has a laterally projecting finger 90a which is disposed within the coin pocket 75 in the path of the inserted coin, and a second laterally projecting finger 90b designed to cooperate with a complementary finger 91a on the arm 91, the latter overlapping the finger 90b in the manner shown in Figs. 11 and 18. The spring 93 bears at its end 93a against the periphery of the projecting end of the bushing 70 from whence it extends upwardly around the spool 92 in the counterclockwise direction as viewed in Fig. 18, thence around a lug 90c on the arm 90 in the counterclockwise direction, and thence again around the spool 92, but in the clockwise direction. The opposite end 93b of the spring bears against the finger 91a. With this spring arrangement, involving as it does only one spring, the arm 90 is biased outwardly so that the finger 90a normally assumes a position adjacent the periphery of the coin carrier (see Fig. 18) while the arm 91 is biased in the opposite direction. When the finger 90a is pressed inwardly of the coin carrier the arm 90 will rotate in the counterclockwise direction, as viewed in Fig. 18, and the arm 91 will at the same time rotate in the same direction, due to its spring bias. Since the only force tending to rotate the arm 91 in the counterclockwise direction is that exerted by the spring 93, the arm 90 is accordingly free to rotate counterclockwise independently of the arm 91 if anything should interfere with rotation of the latter arm in that direction. Under certain conditions there may be interference with rotation of the arm 91 in the counterclockwise direction as viewed in Fig. 18, hence the use of two arms 90 and 91 instead of a single arm as heretofore.

The time indicator setting mechanism and timing gear train or brake

The shaft 53 (see Fig. 9) whose axis of rotation coincides with the major axis of the meter mechanism is journaled in the sleeve 49, and rotatably mounted on the shaft is a disc-like cam member 96 which constitutes the driven element of a uni-directional clutch which serves in the manner of a ratchet and pawl device to permit the storage of power in the timing spring and permits rotation in the direction indicated by the arrow on the member 96 in Fig. 11.

A hub 96c is fixedly secured to the cam member 96 and is rotatably mounted on the shaft 53 adjacent its right-hand end (as seen in Fig. 11). The shaft 53 is enlarged at its right-hand end to provide a bearing journaled in the intermediate plate 26. To the hub 96c is secured one end of the timing spring hereinafter to be described.

Attached to the end of the shaft 53 adjacent the intermediate frame plate 26 by means of a left-hand screw 97 is a flexible coupling 98 which, in turn, is connected to the driving shaft of a brake mechanism 99 comprising a gear train 100 together with an escapement 101 and a balance wheel 102. The brake mechanism 99 which is a self-contained unit of familiar construction is detachably mounted on the rear frame plate 27. Its function is to regulate the rate of return of the time indicator 35, and it is capable of adjustment by altering the tension of a hair spring in generally the same way that an ordinary timepiece is adjusted. The coupling 98 includes a driving disc 104, a driven disc 105, and an intermediate disc 106 interposed between the driving and driven discs and having four peripheral notches 106a arranged in quadrature and engaged by laterally projecting ears 104a and 105a formed on the driving and driven discs, respectively (see Fig. 11a). Such a coupling will operate satisfactorily even when there is some axial misalignment of the main shaft and brake mechanism, and so is advantageous on this account. The driven disc 105 is provided with a central hub 107 which is internally threaded to engage the correspondingly threaded end of a driven shaft 108 constituting part of the brake mechanism 99 (see Fig. 9). The entire brake mechanism, including the driven shaft 108, is enclosed within a sheet metal housing 109 which is detachably secured to the rear frame plate 27 by means of three screws 110. By virtue of the coupling 98, the brake mechanism 99, together with the driven disc 105, is immediately withdrawable upon removal of the three screws 110. Replacement of the brake mechanism, in event of trouble therewith, can consequently be effected in a minimum of time.

A sleeve 112 (see Fig. 9) loosely mounted on the shaft 53 has affixed to it a spur gear 113 and a ratchet wheel 114. A cup-like sheet metal housing 115 which encloses the clutch disc 96 and serves as the driving member of the clutch is press fitted on a knurled portion 53b of the shaft 53. The clutch disc 96 (see Fig. 11) is provided with two diametrically opposite notches 96a, each designed to receive a U-shaped leaf spring 116; and this disc is further cut away to form at opposite sides of its axis of rotation two parallel surfaces 96b each forming a track on which is positioned one of two rollers 118. These rollers are positioned in the plane of the disc 96 within the housing 115, and the chords of the two surfaces 96b are such as to form with the housing two roller-chambers of radially graduated width so that, when the hub 96c and cam member 96 are biased toward rotation in the direction opposite to that indicated by the arrow on the member 96 in Fig. 11, the two rollers are gripped between the respective surfaces 96b and the internal annular surface of the housing 115. Rotation of the hub 96c, and hence the cam 96, is permitted in the direction indicated to store power in the timing spring.

A slip clutch assembly generally designated 117 is used to provide a driving connection between the housing 115 and the spur gear 113 and ratchet sector 114. The slip clutch includes a clutching member 117a mounted for free rotation on the shaft 53 and provided with four flexible metal fingers 117b adapted to bear against the base of a recess 113a formed in the spur gear 113. A thrust washer 117c is also mounted on the shaft 53 intermediate the clutching member 117a and the face of the housing 115, and the shaft 53 is further provided with an annular notch 53c to receive a lock washer 53d to hold the parts in assembled relationship, it being understood that when the parts are so assembled the spring tension of the fingers 117b is sufficient to provide a drive relationship between the housing 115 and the spur gear 113 and its attached ratchet 114 under the impetus of the timing mechanism driving spring, the arrangement being such that slippage is permitted during initial setting of the parking meter.

Mounted on the hub 96c is a circular plate 119 which serves as a cover for the uni-directional clutch mechanism just described, the cover 119, as seen in Fig. 9, being located approximately half way within the housing 115.

Also located within the confines of the housing 115 is a secondary or timing mechanism driving spring 122 which has one end secured to the hub 96c. To facilitate assembling the device, the other end of the spring 122 is provided with a hooked portion 122a which may during assembly of the spring apparatus be hooked over a notch 115a formed in the housing 115. After assembly, the hooked portion may be slipped into the notch where as the spring seeks to unwind, it catches over a post 122b formed on the intermediate plate 26.

Snapping on over the portion 96d of the hub 96c is a spring cover plate 120 provided with an arcuate slot 120a through which the post 122b extends to engage the outer end of the spring and with an outturned lug 120b. The cover plate 120 is also provided with an integrally formed arm 120c to which is secured one end of a coil spring 120d, the other end of the spring being secured to an integrally formed arm 121a of a winding disc 121 which, when the device is assembled, overlies the cover plate 120. In assembled condition a notch 121b embraces the upturned lug 120b to provide a lost motion connection and thereby to permit slight "breathing" movement of the winding disc 121 relative to the disc 120.

Figure 35:
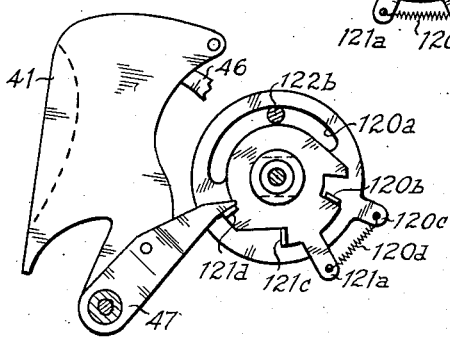
Figure 36:
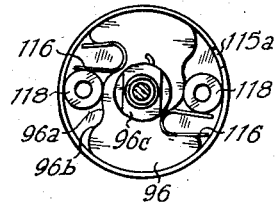

Also formed on the disc 121 are a pair of winding ears 121c and 121d which are adapted to be contacted by the pusher link 47 as the inductor plate 41 is moved inwardly with the insertion of a coin. Thus, when a coin is first inserted the pusher link 47 contacts the first ear 121c to rotate the winding disc 121 from the unwound position indicated in Fig. 31 to the position indicated in Fig. 32, and hence the disc 120 and the hub 96c are rotated to wind the spring 122. If a second coin is immediately inserted into the mechanism the link 47 contacts the second ear 121d as shown in Fig. 35 to wind the spring 122 further. It is contemplated that the winding of the spring accomplished by the contact between the link and the ear 121d will provide the spring with sufficient stored power to complete the longest parking cycle permitted. If additional coins are inserted and the pusher plate or coin inductor is again manipulated, the link 47 will not contact the ear 121d, the same having been rotated with insertion of the second coin to a position where it is no longer reached by the link. Through this medium overwinding of the spring 122 is prevented.

Figure 31:
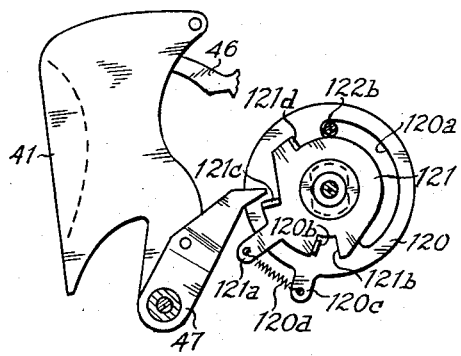
Figure 32:
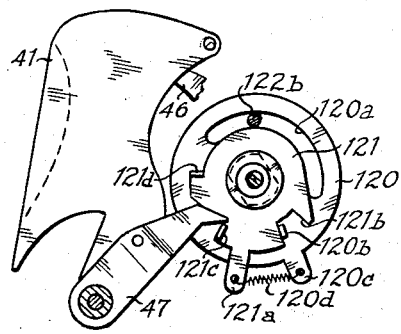
Figure 33:
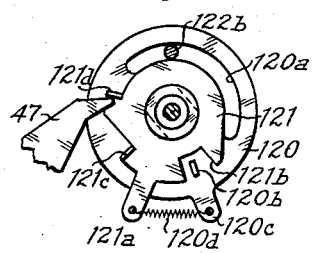
Figure 34:
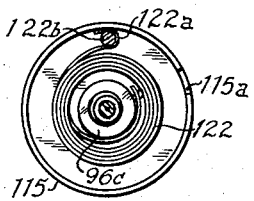

When the inductor returns to its normal position through the action of its spring, the tip of the link 47 may catch under one or the other of the ears 121c or 121d, such as shown in Fig. 33, and for this reason the notch 121b is made considerably wider than the lug 120b to permit a slight movement of either of the ears so that the link may slide thereunder. The spring 120d serves to return the discs 120 and 121 to their proper relative position with the lug 120b abutting the left-hand side (as shown in Fig. 31) of the notch 121b. As the timing spring runs down, the ears 121c and 121d are restored to their original position shown in Fig. 31.

As the timing mechanism times out the purchased parking time, the timing spring 122 through the medium of the slip clutch 117 rotates the gear 114 which is, of course, accompanied by rotation of the sector 124 which also carries the time indicator 35. Thus the timing mechanism seems to bias the time indicator 35 toward the zero scale position and would serve to move the indicator immediately to that position were it not for the delaying action of the escapement mechanism 99.

The lock washer 53d serves as a retainer for a time control plate 128 and a bellcrank 129, both of which are rotatable on the ring 126 relatively to the ratchet wheel 114 and gear 113. This time control plate (see Fig. 11) has an arcuate slot 128a therethrough which clears the shank of a screw 130 threaded into a tapped hole in the ratchet wheel 114 and by means of which the time control plate can be secured against rotation relatively to the ratchet wheel in any rotative position within the limits determined by the length of the slot 128a. Provision is thereby made for adjusting the time control plate relative to the ratchet wheel so as to vary the unit of time during which the mechanism will operate in response to actuation by a major coin. The time control plate 128 has two peripheral teeth 132 and 133 rotatively spaced to a degree corresponding to one-half of the total distance of rotation of the gear 113 or, otherwise stated, one-half the total arcuate sweep of the time indicator 35.

The coin gauge arm 91 has a laterally projecting ear 91b which overlaps the time control plate 128 in the direction parallel to the axis of rotation thereof; and when the coin gauge, including both arms 90 and 91, is pressed inwardly by a major coin, as shown in Fig. 21, the ear 91b is so positioned radially that it is operative to engage one or the other of the two teeth 132 or 133, depending upon which of the two teeth is then in position to be so engaged, and will effect such engagement when the coin carrier is thereafter rotated by the power mechanism in the manner previously explained.

When the meter is fully run down, the tooth 132 is so positioned that, upon rotation of the coin carrier with a major coin therein, it will be engaged by the ear 91b, and the time control plate, together with the ratchet wheel 114, gear 113, and housing 115, will consequently be rotated through a distance sufficient to displace the time indicator 35 to an extent corresponding to a major unit of time, usually one hour. Rotation of the time control plate results in shifting the rotative position of the two teeth so that the tooth 133 then occupies the position previously occupied by the tooth 132; and if a second major coin is promptly deposited and the push plate 41 is depressed, as before, the ear 91b will engage the tooth 133 and, as a result, the time indicator will be further displaced to an extent corresponding to a second major unit of time of the same duration as the first-mentioned major unit. If, on the contrary, there is a considerable delay between the deposit of the first major coin and the deposit of the second major coin, the ear 91b will not engage the tooth 133 but will, instead, again engage the tooth 132 because during the interim the time control plate slowly rotates in the opposite direction under impetus of the spring 122, subject to restraint of the brake mechanism 99.

The bellcrank 129 is freely rotatable on the ring 126, and has a relatively long arm 129a and a short arm 129b which latter is connected, as will later be explained, to a counter which functions to totalize the deposited coins in minor coin units. The free end of the arm 129a is approximately co-terminous with the teeth 132 and 133 and consequently when the time control plate 128 is rotated, as a result of engagement of one of its teeth by the coin gauge ear 91b, the free end of the arm 129a will also be engaged by this ear, and the bellcrank will accordingly be rotated. The mechanism whereby the coin counter is actuated to record receipt of a major coin in response to rotation of the bellcrank 129 will be discussed in detail at a later point.

*Operation with a minor coin*

Special reference is now made to Figs. 9, 13 and 22–24 in conjunction with the ensuing description of mechanism having to do specifically with setting of the meter in response to a minor coin, and explanation of the mode of operation thereof.

The diameter of a minor coin is enough smaller than that of a major coin so that the coin gauge is not pressed inwardly thereby far enough to enable the coin gauge ear 91b to engage either tooth 132 or 133. The ratchet wheel 114 has a series of peripheral ratchet teeth 134 engageable by a pawl 135 having a tooth-engaging lug 135a. This pawl comprises two parallel arms 135b and 135c which are laterally spaced and joined together by a bridge portion 135d. The arm 135c is notched to form a shoulder at 136 which is positioned for engagement by the ear 91b of the coin gauge arm 91 whenever the coin carrier is rotated with a minor coin, as illustrated in Figs. 23–25. The pawl 135 is pivotally connected at 137 to the distal end of an arm 138 which is mounted for free rotation on a bushing 139 fixedly secured to and carried by a shaft 140 (see Fig. 9). A spring 142 having one end connected to the arm 135b and the other end anchored to a finger 141a on a bracket 141, serves normally to hold the pawl 135 and the arm 138 in the retracted positions shown in Fig. 22 where the coin carrier occupies its normal coin receiving position with a minor coin inserted therein. Fig. 23 shows the condition which obtains when the coin carrier is partially rotated with a minor coin, the ear 91b being about to engage the shoulder 136 on the pawl 135. Fig. 24 shows a condition which obtains after the ear 91b has engaged the shoulder 136 of the pawl 135 and the coin carrier has completed its rotary movement. When the ear 91b encounters the shoulder 136 the pawl 135 is rotated clockwise about its pivot 137 until the lug 135a is seated in a notch between two of the ratchet teeth 134; thereafter the force imparted to the pawl 135 by the coin gauge produces rotation of the ratchet wheel 114 and concurrent rotation of the gear 113. Because the pawl 135 is precluded from further rotation after engaging the ratchet wheel 114, any further movement thereof by the coin gauge causes the arm 138 to rotate from the normal position in which it is shown in Fig. 22 to the alternate position of Fig. 24. The rotative displacement of the ratchet wheel 114 effected by a single actuation of the pawl 135 in response to a minor coin, is a proportional part of the angular displacement thereof which occurs in response to a major coin. For example, if the value of the minor coin is one-fifth that of the major coin, the mechanism would ordinarily be so designed that the distance of rotation of the ratchet wheel 114 effected by a single actuation of the pawl 135 is one-fifth the distance of rotation thereof effected in response to a major coin. It is optional, however, to design the mechanism otherwise, so as to cause a disproportionate displacement of the ratchet wheel in return for a minor coin.

*The coin counter and counter actuating mechanism*

The coin counter per se which is identified as a whole by reference numeral 145 is shown in perspective in Fig. 13. It is removably attached to and supported by the rear frame plate 27 at the location shown in Fig. 7, and operates to count the coins in relation to the number deposited, and not in relation to the time registered on the indicator. This device includes a driven spur pinion 146 which is continuously in mesh with a spur gear 147, and rotation of the pinion 146 is effective to actuate the counter and thus cause the numerical reading to progress in proportion to rotative advance of the gear 147. To register a major coin on the counter, the gear 147 must rotate through a distance which is proportionate to the value of the major coin, and likewise to register a minor coin the gear 147 must rotate through a distance which is proportionate to the value of the minor coin.

Referring now to the bell crank 129 (see Fig. 11), it has been previously noted that when the coin gauge ear 91b engages one of the two teeth 132 or 133 on the time control plate 128 it also engages the free end portion of the bellcrank arm 129a, being thus adapted to rotate the bellcrank at the same time that it rotates the time control plate. The ear 91b also engages the arm 129a and one or the other of the teeth 132 or 133 only when a major coin is in the coin carrier. The bellcrank 129 is never displaced from its normal position save in response to the deposit of a major coin.

A sheet metal rocker 148 (see Fig. 13) which is freely rotatable on the bushing 139 (see Fig. 9) includes an arm 148a which is apertured to receive the laterally projecting lower end of a link 149 the upper end of which engages an aperture in the short arm 129b of the bellcrank 129, as clearly shown in Figs. 19 and 21. The rocker 148 also includes a pair of laterally projecting fingers 148b and 148c the function of which will be explained later.

Fixedly secured to and rotatable with the sleeve 139 is a small ratchet wheel 150; and attached to the rocker 148 is a spring pawl 151 the free end of which engages the teeth of the ratchet wheel 150 (see Figs. 13, 18 and 20). A spring dog 154 anchored to the plate 88 has its free end engaged with the teeth of the same ratchet wheel and serves to prevent reverse rotation thereof. Inasmuch as the gear 147 is affixed to the shaft 140 which, in turn, is affixed to the bushing 139 which also is affixed to the ratchet 150, rotation of the rocker 148 in the clockwise direction, as viewed in Figs. 18 and 20, will effect a corresponding rotation of the gear 147 and also a commensurate progression of the coin counter 145. Each rotation of the bellcrank 129 by the coin gauge will cause the rocker 148 to be rotated clockwise through the agency of the link 149, and will also effect a rotation of the gear 147 sufficiently to actuate the coin counter to an extent corresponding to a major coin irrespective of the position of the indicator 35.

Freely rotatable on the bushing 139 is a second sheet metal rocker 152. This has an upstanding arm 152a on which are formed two parallel laterally projecting ears 152b spaced apart to loosely embrace the arm 138. This rocker further includes a second arm 152c having a laterally projecting finger 152d and third arm 152e to the rear face of which, as viewed in Figs. 13 and 22, is secured to a spring pawl 153 the free end of which engages the teeth of the ratchet wheel 150. There are two pawls, 151 and 153, and a spring dog 154 all engaging the teeth of the ratchet wheel 150.

The normal position of the rocker 152 is that shown in Fig. 22 wherein the left-hand ear 152b bears against the adjacent side of the arm 138. As this arm is rotated toward the position shown in Fig. 24, in response to minor coin actuation, it tardily engages the right-hand ear 152b and thus produces a clockwise rotation of the rocker 152 through a small distance. This occurs during the final portion of the driving movement of the pawl 135 which is effected when the meter is set with a minor coin. During this clockwise rotation of the rocker 152 the ratchet wheel 150 is rotated by the pawl 153, but the extent of its rotation is only a fraction of the distance through which it is rotated by the pawl 151 in response to rotation of the rocker 148. The ratio of the two distances of rotation of the ratchet wheel 150 effected respectively by the rockers 148 and 152 corresponds with the ratio of the major and minor coin values. The coin counter is progressed by the lesser rotation of the ratchet wheel 150 to an extent commensurate with the value of a minor coin.

The bracket 141 (see Fig. 13) provides an outboard bearing for the shaft 140, and is rigidly secured to the plate 88 by means of two screws 141b. The part 159 (see Figs. 9 and 13) serves only as a spacer. A cantilever wire spring 163 (see Fig. 18) is anchored at one end to the plate 87 and engages at its other end the finger 148b. This spring functions to bias the rocker 148 counterclockwise toward the position shown in Fig. 18. It also biases the bellcrank 129 towards its normal position (see Fig. 18).

*The coin arresting and release mechanism*

The front frame plate 25 has a rectangular opening 155 (see Figs. 1, 6 and 10) which registers with a window (not shown) in the housing H; and the plate 87 which is spaced rearwardly of the front frame plate 25 has two circular openings 156 and 157 in registration with the opening 155 the purpose being to make visible the last-deposited major and minor coins, thus enabling the attending officer to ascertain whether the operator of a parked car has deposited a proper coin. Both coins are thus exposed to view, and if a slug of major size has succeeded in purchasing time it must be replaced by a major, not a minor, coin for proper operation.

The two plates 87 and 88 are spaced laterally by the plate 86 on which is formed the coin track 85, and also by a spacer strip 89 of the same thickness as the plate 86 (see Fig. 13). The thickness of the plate 86 and spacer strip 89 is slightly greater than that of a major coin, as is also the plate 68 of the coin carrier which is aligned with the plates 86 and 89 (see Fig. 9). Otherwise stated, the coin carrier pocket 75 (see Fig. 11) is aligned laterally with the coin track 85.

When the coin carrier has rotated about 90° from the coin-receiving position in which it is shown in Figs. 18 and 22 to the coin-discharge position of Figs. 20 and 24 the coin is ejected downwardly by the force of gravity. The descending coin passes through the space between the plates 87 and 88 until it either strikes a stop 158 (which is an ear formed on the plate 88 projecting into the coin passageway) or until it strikes a coin held in the passageway and is deflected thereby. Assuming that there is no previously-deposited coin in the meter, when either a major or minor coin drops from the carrier it will strike the stop 158 and will be deflected thereby to one side or the other. If the first-deposited coin is a major coin L, as shown in Figs. 18–21, it will bounce off the stop 158 to the right, as per Fig. 18. This it will normally do because the stop 158 is positioned slightly to the left of the descending major coin. In that event the coin will be caught on an ear 148c which forms an integral part of the rocker 148 and projects laterally therefrom underneath the arcuately curved edge surface 88c formed on the plate 88, and thus into the path of the descending coin. The position in which the coin L is held by the ear 148c and stop 158 in Fig. 18 is in registration with the opening 156, and the coin is accordingly visible through the opening 155 and the window in the meter housing. If another major coin be deposited in the meter while the previous major coin L is held by the ear 148c, as shown in Fig. 18, operation of the meter with a major coin will produce clockwise rotation of the rocker 148 from the position of Fig. 18 to that of Fig. 20, and the ear 148c will move to the left (see Fig. 20) and release the previously deposited coin L while the ear 148b moves in the same direction to a position wherein it is effective to intercept the last-deposited coin. When the rocker 148 is immediately thereafter returned to its normal position (see Fig. 18) as a result of the return movement of the coin carrier, the last-deposited coin is released by the ear 148b and allowed to drop, but is immediately intercepted by the ear 148c. In Fig. 18 a major coin L is shown supported on the ear 148c and stop 158, conjointly. In Fig. 20 the same coin L is shown dropping from the meter as a result of the clockwise movement of the finger 148c; and in the same figure a later-deposited major coin L' is shown supported on the ear 148b. When the rocker 148 returns to the position of Fig. 18, as it does incidentally to the return of the coin carrier to normal position, the coin L' will be released from the position in which it is shown in Fig. 20 and will descend to the position of the coin L in Fig. 18.

When there is no previously-deposited coin in the meter, if a minor coin S is deposited it will take the same course as that previously described with reference to a major coin and will thus appear at the opening 156. It is an unusual condition, however, not to have a coin resting on the ear 148c, as shown in Fig. 18, and one which can obtain only when the meter is first put into service or in event of the coins being removed by a service man and not replaced before the meter is put back into service. Therefore, except for the rare instances mentioned above, there is always a major coin L resting on the ear 148c, as shown in Fig. 18, whenever a minor coin S is deposited.

Under normal conditions when a minor coin S descends from the coin carrier (see Fig. 22) it strikes the previously-deposited coin L and is deflected to the left, and then comes to rest on the ear 152d where it is in registration with the opening 157 (see Fig. 1). Under the same normal conditions there is always a minor coin resting on the ear 152d; and when the rocker 152 is rotated clockwise from the position of Fig. 23 to that of Fig. 24, the ear 152d is moved sufficiently to the left (see Fig. 24) to release the previously-deposited minor coin. The rocker 152 is not displaced from its normal position until the coin carrier has reached nearly the end of its counterclockwise rotation, and it is thereafter quickly released for return to normal position. Consequently, a complete operation of this rocker takes place so rapidly that the ear 152d is in position to intercept the last-deposited minor coin immediately following discharge of the previously-deposited minor coin, and before the last-deposited coin can descend far enough to escape interception. While it is necessary to provide two ears on the rocker 148 to intercept and release major coins, such is not the case for the interception and release of minor coins, due to the rapid action of the rocker 152.

The trouble flag

The shaft 125 (see especially Figs. 9 and 25) is journaled for rocking movement at its opposite ends in the front frame plate 25 and the intermediate frame plate 26, and mounted for free rotation on this shaft is a U-shaped member 160, best shown in Fig. 25. The member 160 comprises two parallel arms 160a and 160b the former of which includes a flag portion 160c which preferably is painted some distinctive color so that it will readily be seen when in exposed position. The arm 160b carries a laterally projecting pin 161 the function of which will be explained later.

Figure 26:
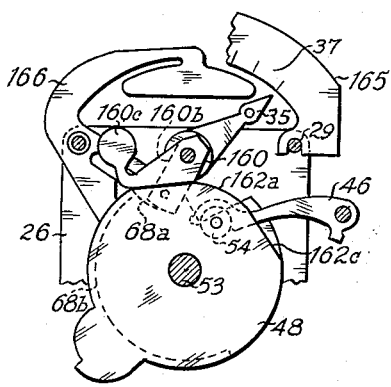
Figure 28:
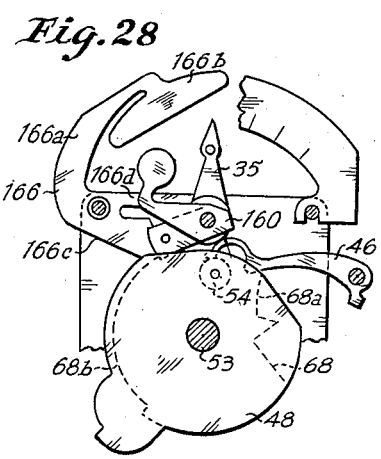
Figure 27:
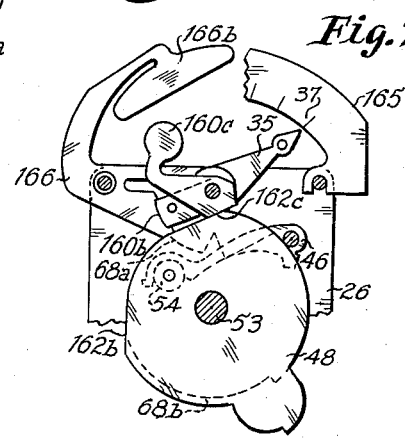

As best shown in Figs. 26–28, the power plate 48 is contoured to provide a peripheral cam surface 162 which includes an arcuate mid-portion 162a concentric with its center of rotation and terminating in two tangential end portions 162b and 162c. The bottom edge of the arm 160a rests on the cam surface 162 and normally overlies the portion 162b thereof, as shown in Fig. 26. When thus disposed the flag 160c is out of sight; but when the power plate 48 is rotated to its alternate position, as shown in Fig. 27, the cam portion 162c rotates the member 160 clockwise, thus causing the flag 160c to move to a position in which it is visible. If for any reason the power plate should fail to return (arising perhaps from a jammed coin carrier or a broken power spring) the flag 160c will remain visible and thus inform the attending officer that the meter is out of order.

The coin carrier locking mechanism

In many meter constructions it has been possible to produce a limited rotation of the coin carrier through use of two coins and thus obtain a certain amount of parking time without forfeiting either coin. In such circumstances the coin gauge would be depressed sufficiently to render it effective to actuate the time-setting mechanism, and the coin carrier to be rotated independently of the power mechanism sufficiently to obtain some parking time, but without rotating the coin carrier far enough to discharge either coin. Any such attempted fraudulent operation is prevented in the present meter by a mechanical arrangement which locks the coin carrier in its coin-receiving position until just an instant prior to the moment when it must be released to permit rotation thereof by the power mechanism, thus making it impossible to unlock the coin carrier without causing it to be rotated by the power mechanism to its coin-discharge position.

Referring first to Fig. 11, the coin carrier intermediate plate 68 is notched to form a shoulder at 68a; and now referring to Fig. 26, wherein both the coin carrier 66 and the power plate 48 are shown in normal position, the arm 160b of the U-shaped member 160 is so positioned that its free end engages the shoulder 68a in such manner that it is effective to prevent clockwise rotation of the coin carrier.

In Fig. 27 the power plate 48 is in an alternate position wherein the pusher link 46 is about to disengage the roller 54 and thus allow the power plate to return to the position of Fig. 26 under the impetus of the power spring 51. The member 160 is here shown to have been rotated clockwise by the cam surface 162c to such an extent that the arm 160b is out of the path of the shoulder 68a. When the power plate 48 starts its return movement, the coin carrier is then free to rotate therewith. Fig. 28 shows the coin carrier in its coin-discharge position and the power plate 48 in its normal position the coin carrier being about to return to the normal position of Fig. 26. By suitable configuration of the cam surface 162c, as shown, the arm 160b is operative to release the coin carrier only an instant before the power plate is released to return to its normal position, and for that reason it is practically impossible for anyone to unlock the coin carrier by depressing the manually operable coin inductor 41 without at the same time releasing the power plate. It would be even more difficult to do so while at the same time trying to rotate the coin carrier by means of two coins, or by a specially shaped instrument inserted through the coin slit 40.

As previously explained, the trouble flag 160c is elevated when the power plate 48 is in its alternate position, as per Fig. 27, and in the event of failure of the power plate to return to normal the trouble flag will remain up. The trouble flag is also effective to signal a failure of the coin carrier to return to its normal position. The coin carrier plate 68 has an arcuate peripheral surface 68b terminating at the shoulder 68a, and the lower edge of the arm 160b comes to rest on this arcuate surface immediately upon commencement of the clockwise rotation of the coin carrier (see Fig. 28). The trouble flag is thus held in elevated position until the coin carrier has virtually completed its return movement. If for any reason the coin carrier should fail to return, the trouble flag will then remain up and thereby indicate an abnormal condition.

*The violation flag and operating mechanism therefor*

It is desirable to have the violation flag in an elevated position when withdrawn from view, and also to position the time indicator 35 so that it is visible from two opposite sides of the meter. In the accomplishment of these ends there is incorporated in the structure two similar dial plates 165 each of which, as best shown in Fig. 10, consists of an arch-like sheet metal stamping to at least one face of which is applied a graduated scale 37. The two ends of each dial plate are notched at 165a so that each may embrace one of the two upper tie bolts 29; and the dial plates are clamped between adjacent spacers 28 and thus firmly secured in place, although easily removable upon loosening of the two upper tie bolts.

The two dial plates 165 are in parallel spaced relation, as best shown in Figs. 7 and 8, and positioned intermediately thereof are the time indicator 35 and a violation flag member 166. The latter may be a sheet metal stamping affixed to a tubular hub 167 and, as shown, it comprises an upwardly extending arm 166a, including the flag 166b, per se, and two more or less parallel additional arms 166c and 166d. These two arms extend obliquely in a downward direction from the hub 167 when the flag is in its visible position, as per Fig. 26, but otherwise they extend horizontally, or approximately so, as per Figs. 27–29. The arm 166c has a lateral finger 166e which projects through an arcuate slot 26a in the intermediate frame plate 26, and this slot cooperates with the finger 166e to limit the distance of rotation of the flag member 166 in both directions. The hub 167 of the flag member is provided with a tubular bushing 167a the bore of which slidably fits one of the two upper tie bolts 29. It will be apparent that the flag member is freely rotatable about the axis of the hub 167, and that when rotated clockwise, as viewed for example in Fig. 26, to the limit permitted by the slot 26a and the finger 166e, the flag 166b is clearly visible. Also, when rotated counterclockwise to the alternate limit permitted by the slot 26a, the flag 166b is hidden from view by the two dial plates 165 (see Figs. 27–30).

The time indicator 35 is affixed to a hub 168 (see Fig. 9) which, in turn, is affixed to the shaft 125; and the toothed sector 124 is also mounted on this hub and secured between two friction washers 169 and 170. This sector is not rigidly affixed to the hub 168, but the frictional coupling therewith is sufficient so that the hub and the time indicator 35 normally rotate with the sector 124, while at the same time allowing the time indicator and the hub to be forcibly rotated relatively to the sector for the purpose of adjusting the indicator with reference to the graduated time scale 37 when the indicator is at zero. When at other than zero, adjustment may still be made because of the slip clutch 117. One side of the hub 168 is made flat in a plane parallel to its axis of rotation (see Figs. 25 and 30), the flat surface being identified by reference numeral 168a. Its purpose will presently be made clear.

In prior meter constructions the violation flag has been directly actuated by the manually operable element corresponding to the push plate 41 of the present application, and when properly operated the flag-raising mechanisms employed in those meters worked satisfactorily; but through tricky manipulation of the manually operable element it has been possible to set such a meter without raising the violation flag. The device illustrated provides for actuation of the violation flag in a manner which avoids all possibility of faulty operation, or failure of operation, resulting from irregular or tricky manipulation of the manually operable element.

A U-shaped rocker member 172 is supported at one end on the shaft 125 and at the other end on the hub 168, being freely rotatable through a limited arc relatively to both said shaft and hub. The pin 161 projecting laterally from the arm 160b of the member 160 is so positioned that when this member is rotated clockwise from the normal position of Fig. 26 to that shown in Fig. 27, said pin will engage the adjacent edge surface of the rocker member 172 and rotate the latter clockwise. The rocker member, in turn, engages the under side of the arm 166d of the flag member 166 and rotates the latter counterclockwise so that the flag 166b is elevated to the position in which it is shown in Figs. 27–30, wherein it is hidden from view by the two dial plates 165.

Counterclockwise rotation of the power plate 48 (see Fig. 27) is effective to lift the flag, and the immediately ensuing clockwise rotation of the coin carrier is effective momentarily to hold the member 160 in its off-normal position during the return of the power plate to its normal position. However, as soon as the coin carrier has returned to its coin-receiving position the member 160 is restored to the position shown in Fig. 26 because the coin carrier plate 68 is then no longer effective to hold the arm 160b in its elevated position. In the absence of means to the contrary, the violation flag 166b would return to the down position as soon as the coin carrier has completed its return movement, but such an operation should not be permitted because the flag is to remain invisible until the time on the meter has expired.

The ratchet wheel 114 (see Figs. 11, 29 and 30) has a notch 114a defining a ledge at 114b and a shoulder 114c. This shoulder normally engages the thimble 80 (see Fig. 18) with which it cooperates to limit the rotation in one direction of the sub-assembly including the ratchet wheel 114, gear 113, clutch housing 115, and the time control plate 128. When the coin carrier with a coin therein is rotated from coin-receiving to coin-discharge position, the above-indicated sub-assembly is rotated in the clockwise direction (see Figs. 29 and 30) through a distance commensurate with the value of the coin. When the ratchet wheel 114 is in the position indicating a fully-expired meter condition, the shoulder 114c rests against the thimble 80 and the ledge 114b is so positioned that the adjacent portion of the rocker member 172 overlies the notch 114a. Consequently, until the meter is again energized the rocker member 172 is without support, except at the ends which are pivotally connected to the shaft 125 and the hub 168; and there is accordingly nothing to retain the violation flag in its concealed position.

Now considering a condition wherein the violation flag has been raised as a result of rotation of the power plate 48 and is momentarily held in an elevated position by the coin carrier plate 68 acting on the arm 160b, it will be apparent that the rocker member 172 is then in a position to clear the ledge 114b. Therefore, when the ratchet wheel 114 is rotated clockwise by the coin carrier, through the agency of the coin gauge, the peripheral sector 114b (see Fig. 30) will at once move to a position underneath the rocker member 172 and thus provide a support therefor which takes the place of the support initially afforded by the pin 161. We have accordingly devised a simple expedient which serves to provide support for the violation flag during that portion of the movement of the ratchet wheel 114 when it will not function to hold the violation flag in fully elevated position. This expedient involves cooperative interaction between the hub 168 and the free end of the arm 166d. When the time indicator 35 is at and near the zero end of the dial scale (see Fig. 30) the flattened side 168a of the hub 168 is so positioned that the arm 166d is free to pass; in other words, when the ratchet wheel 114 has arrived at the position wherein the ledge 114b has passed the rocker member 172, so that the surface 114b no longer provides support for the rocker member, the arm 166d will clear the hub 168 because of the flattened side thereof. But by the time the ratchet wheel 114 has rotated clockwise to the point where the rocker member 172 can no longer be supported on the sector 114b, the hub 168 has rotated to a position wherein it is effective to prevent downward movement of the arm 166d. This is clearly illustrated in Fig. 29.

Figure 29:
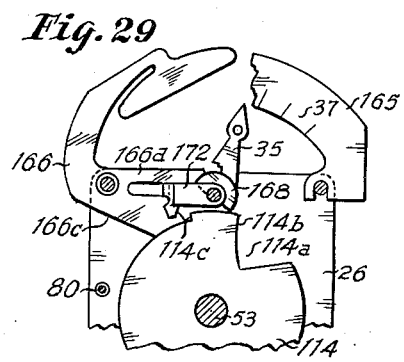
Figure 30:
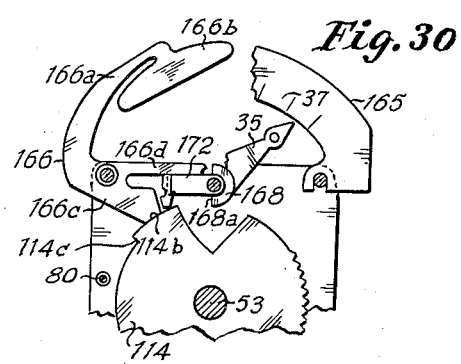

When the ratchet wheel 114 is in the rotative position shown in Fig. 29, the rocker member 172, if not otherwise supported, would rest on the periphery of the ratchet wheel in the path of the shoulder 114c and might on that account impede counterclockwise rotation of the ratchet wheel; this might either stop it entirely or else apply additional braking force and thus increase the time required for the indicator to return to zero over and above the normal period. To obviate such a contingency, the arm 166c is designed to underlie the rocker member 172 when the arm 166d is supported by the hub 168, as shown in Fig. 30; the violation flag 166 is then supported in an up position out of view of the attending officer. It may not always be necessary to make use of the hub 168 to support the violation flag, and the shoulder 114c may be supplanted by a stop which will permit the sector 114d to be extended far enough to provide support for the rocker member 172 throughout the entire sweep of the time indicator.

*Blocking the meter against operation by apertured slugs or washers*

Referring to Figs. 11 and 12, the rocker 175 is secured to the adjacent side of the coin carrier 66 and is bent along the line 176 to provide in contact with the coin carrier a fulcrum about which the rocker is adapted to oscillate through a small distance. An aperture 177 is designed to receive the enlarged portion of the pin 82 which is attached to the coin carrier, and another aperture 178 is provided to receive another pin (not shown) projecting from the side of the coin carrier. These two pins which are centered on the line 176 serve to locate and mount the rocker 175 so that it will revolve with the coin carrier and retain its positional relation thereto while at the same time being free to rock on its fulcrum 176. A third aperture 179 is positioned near but to one side of the fulcrum 176 and is designed to clear the enlarged shank portion of a shouldered screw 180 which is threaded into the coin carrier. A helico-conical wire compression spring 181 embraces the enlarged shank portion of the screw 180, and is interposed between the head of this screw and the adjacent outer surface of the rocker 175 so that the leg 175a of this rocker is normally pressed by the spring against the side of the coin carrier. The other leg 175b lies in a plane which is acutely angular to the plane of the leg 175a and therefore normally extends from the fulcrum 176 at an acute angle to the adjacent side of the coin carrier. This is clearly shown in Fig. 12. The outboard end of the leg 175b has a laterally projecting pointed finger 175c which is aligned with a clearance notch 184 formed in the coin carrier plate 67. It will be apparent that the rocker 175 is capable of being rotated out of its normal position of Fig. 12 so that the finger 175c will enter the coin pocket 75 through the clearance notch 184; if there is a proper coin in the coin pocket 75 the pointed end of the finger 175c will be intercepted thereby, and the degree of possible rotation of the rocker will thus be substantially reduced. The pointed end of the finger 175c is positioned to align with the central area of any coin in the coin pocket which would be capable of moving the coin gauge to an effective position. Hence, if a washer corresponding in diameter to either a major or minor coin is inserted into the coin carrier, its aperture will clear the end of the finger 175c and, accordingly, will not interfere with rotation of the rocker 175 about its fulcrum. Other components about to be described co-operate with the rocker 175 in such manner that the power plate 48 is prevented from rotating far enough to permit the latch 60 to drivably engage the roller 83 unless the end of the finger 175c is intercepted, as by a valid coin in the coin pocket. Consequently, any attempt to set the meter through use of a washer will be frustrated because of failure of the power plate to drivably engage the coin carrier.

A leaf spring 185 (see Fig. 11) secured by a rivet 186 to the face of the power plate 48 has a free end portion 185a which is operative to contact the leg 175b of the rocker 175 and thus urge the leg toward the coin carrier whereby to cause the finger 175c to move into the coin pocket or to engage the adjacent face of a coin in the coin pocket, depending upon whether or not a proper coin has been deposited. The spring 185 is so positioned, however, that it does not normally engage the rocker 175 but, instead, makes contact with the leg 175b thereof only after the power plate 48 on which it is mounted has been rotated to some extent away from its normal position. Thus, when both the power plate and the coin carrier are in normal position the finger 175c is retracted by the action of the spring 181. This is necessarily so because otherwise the finger 175c would interfere with admission of a coin to the coin pocket 75.

If the power plate 48 be rotated, as by depressing the inductor push plate 41, and there is no coin in the coin carrier pocket, or, alternatively, that there is a washer therein, then when the free end portion 185a of the leaf spring 185 makes contact with and moves along the angularly extending leg 175b, the latter will be deflected so that the rocker 175 will rotate about its fulcrum 176. The spring 181, being relatively weak, will yield to the dominant pressure exerted by the spring 185.

Rotation of the rocker 175 causes the free end of its leg 175a to be moved against the adjacent surface of the power plate 48; and attached to the power plate is a laterally projecting pin 186 which is positioned to engage the end of the leg 175a whenever there exists a condition as above noted. As a result, further rotation of the power plate is blocked, and the blocking occurs before the power plate has rotated far enough for the latch 60 to clear the roller 83 and thus be in a position to drivably engage the roller during the return rotation of the power plate. If there is a proper coin in the coin pocket of the carrier, the pointed end of the finger 175c will make contact therewith, thus preventing further rotation of the rocker 175 which is sufficiently stiff to resist yielding under pressure of the spring 185. The leg 175a will then clear the pin 186, thus removing any impediment to full rotation of the power plate.

Means is provided to release the rocker leg 175b from pressure of the spring 185 at the time the coin carrier reaches its coin-discharge position. To that end the spring 185 is so positioned that its free end 185a traverses an arcuate path which coincides with the inner edge of the rocker 175, and the latter is so formed that the contacting end of the spring passes therebeyond after the pin 186 has arrived at a point beyond which it cannot be engaged by the leg 175a so as to obstruct further rotation of the power plate. Release of the rocker from the action of the spring 185 is preferably deferred until just before the power plate is released to its normal position and after the latch 60 has arrived at the point where it can drivably engage the roller 83. It would be possible otherwise to first insert a major coin and then partially depress the coin inductor 41 and thereafter withdraw the major coin and replace the same with a washer, while at the same time further depressing the inductor push plate to the full extent of its inward stroke. Such a manipulation is almost impossible to perform where the rocker 175 is not released from the spring 185 until the roller 54 is very close to being released from its driving engagement with the pusher link 46.

*The barrier for preventing insertion or withdrawal of a coin when the manually operable element is partially depressed*

Referring first to Fig. 13, there is here shown a U-shaped barrier element 188 made preferably of stiff spring-tempered wire and comprising two parallel arms 188a interconnected at their upper ends by a crossbar 188b and having two opposing trunnions 188c at their respective lower ends. These trunnions are inserted, individually, in apertures 189 and 189a in the respective plates 87 and 88 for rotative movement therein. The common axis of the trunnions 188c constitutes the pivotal center of the element 188. The normal position of this element is shown in Fig. 17 wherein the crossbar 188b rests on an inclined surface 41a formed on the back of the inductor push plate 41. In Fig. 15, wherein the coin inductor is shown almost fully depressed, the element 188 is represented as having been rotated clockwise by the camming action of the surface 41a so that the crossbar 188b is considerably elevated above the position which it occupies in Fig. 17. When in the normal position of Fig. 17, the crossbar 188b is at an elevation below the lowermost extremity of the coin slit 40 and consequently does not offer any impediment to passage of coins therethrough. But, as the push plate 41 is depressed the crossbar 188b is elevated (see Fig. 15) so that it lies opposite the coin slit 40. When the coin inductor is depressed to a certain extent it is no longer possible to pass either a major or minor coin through the coin slit (see Figs. 15 and 17). Hence, it is not possible to withdraw a coin from the coin carrier while holding the push plate 41 in substantially depressed position; nor is it possible to use a second coin to press inwardly against a previously inserted coin. It is impossible, for example, to cheat the meter by inserting a minor coin and pressing the same into the coin carrier by a second coin or by an appropriate tool, such as a hack saw blade, while depressing the push plate 41.

The rocker 175 remains subject to pressure from the spring 185 until just prior to the instant when the power plate 48 is released and after the latch 60 is in position to drivably engage the roller 83 and thus effect a coupling between the power mechanism and the coin carrier, it being otherwise possible to make successful use of washers. But when the meter is equipped with a coin slot barrier which functions in the manner of the element 188, it is impossible to withdraw a coin from the coin carrier while holding the manually operable coin inductor 41 in a depressed position, assuming that the degree of depression is sufficient to enable the leg 175a of the rocker 175 to clear the pin 186. It is accordingly impossible when the barrier is employed to substitute a washer in place of a coin, after using the coin, to circumvent action of the rocker 175 in the manner described, even though the rocker 175 be released from the restraint of the spring 185 immediately after the leg 175a has cleared the pin 186 and considerably prior to the instant of release of the power plate. The point at which the rocker 175 is released from restraint of the spring 185 need not be precisely fixed, and it is possible, in consequence, to use a much wider production tolerance in the manufacture of the involved parts.

*Provision for preventing malicious misdirection of coins*

In the exploded view of Fig. 10 there is shown a formed sheet metal arm 190 comprising two parallel side plates 190a, a bridge portion 190b interconnecting the side plates, and a laterally projecting ear 190c. The side plates 190a are provided with aligned openings 190d by means of which the arm 190 is pivotally supported on a screw 191 which extends through the loop of the spring 46c, thence through a bushing 192 on which is pivotally mounted the pusher link 46, and thence through an opening drilled in the boss 41d, forming an integral part of the push plate 41, and through the aligned openings 190d. At its threaded end the screw 191 is provided with a nut 193. The bridge portion 190b is provided with a slot 190e wide enough to pass a major coin and having an upper extremity which serves to block upward diversion of the coins. The spring 46c bears downwardly at one end on the pusher link 46 and upwardly at the other end on the ear 190c and thus normally serves to hold the arm 190 in the raised position shown in Figs. 14 and 17. In this position the arm 190 is yieldably held by an ear 190f formed on the arm and normally bearing against an upper edge of the push plate 41 (see Fig. 17).

The maximum spacing between the rear face of the push plate 41 and the adjacent edges of the plates 87 and 88 which define the slot leading to the coin track and the coin carrier pocket, is small enough so that a minor coin, as well as a major coin, will readily bridge the gap therebetween. It is not possible in normal operation for a customer to so insert a proper coin that it will not enter the slot between the plates 87 and 88 and then pass on into the coin carrier, even in the absence of the arm 190. But it is possible, in the absence of this arm, through the use of a second coin to propel a first-inserted coin upwardly, while at the same time causing it to turn in such a way that instead of entering the coin carrier it will take an abnormal course and either become lodged in the mechanism or drop to the bottom of the housing and come to rest without entering the coin receptacle located below the meter mechanism. The arm 190 with its slot 190e simply provides an intermediate coin guide which is effective to prevent both upward and lateral diversion of an inserted coin, thus defeating any such improper manipulation. A fixed guide to serve the purpose would interfere with the essential movement of the push plate 41.

When the push plate 41 is in its normal outward position (see Fig. 17) the arm 190 is so poised that its slot 190e largely bridges the gap between the rear extremity of the coin slit 40 and the forward extremity of the slot between the plates 87 and 88 leading into the coin carrier pocket, and the upper extremity of the slot 190e is so positioned that it would be impossible to propel upwardly a coin inserted through the coin slit 40. The sides of the slot 190e afford supplemental lateral support for inserted coins, particularly minor coins, to such an extent that it is not possible to cause any such coin to be diverted laterally of the path provided therefor.

As the manually operable push plate 41 is pressed inwardly, the arm 190 moves with it and for a time retains its same position relatively thereto, but presently the ear 190c at the distal end of the arm 190 strikes the power plate, stopping short of the coin carrier; and when that occurs the arm must yield, otherwise it would prevent depression of the inductor pusher plate 41.

The relieved coin track

Where the major and minor coins are of five-cent and one-cent denomination, the diameter difference is small, being about 0.70". If the curvature of the coin track 85 be of constant radius from the major axis of the meter, the radius of the path of the coin gauge ear 91b obviously differs only to that extent as between major coins on the one hand and minor coins on the other. With a minor coin in the carrier the radius of the path of the ear 91b would then be approximately .070" greater than the radius of the path of said ear with a major coin in the carrier. When a major coin is deposited the ear 91b must drivably engage one of the two identical teeth 132 or 133 on the time control plate 128, and when a minor coin is deposited this ear must not only clear the tips of those teeth but must drivably engage the shoulder 136 on the pawl 135. If it be assumed that the ear must move outwardly .030" to clear one of the teeth 132 or 133 and another .030" to satisfactorily engage the shoulder 136, both of which are less than conservative allowances, then there is a total allowable margin of only .010" as respects the radial locations of the tips of the teeth 132 and 133 and the tip of the shoulder 136. Considering that those locations, especially that of the tip of the shoulder 136, are subject to several possible manufacturing variables, any such margin is much too small where volume production is involved.

It has been necessary with prior devices to maintain a number of very close tolerances in order to achieve reliable engagement of the coin gauge with the tooth or teeth of the time control plate and, alternatively, with the pawl 135 while at the same time ensuring positive differentiation, i. e., positive avoidance of overlap. Once the coin gauge has made contact with one of the teeth of the time control plate (which it can do only under the compulsion of a major coin) it is unnecessary to continue to hold the coin gauge in its depressed position by means of the coin. Displacement of the coin gauge by major and minor coins, respectively, takes place in entirely distinct sectors. Therefore the radius of curvature of the track 85 in one sector is wholly functionally independent of that in the other sector, and may differ therefrom to any extent within certain practical limitations which do not inhibit the attainment of my objective.

In the normal position of the tooth 132 (see Fig. 18) the coin gauge ear 91b engages that tooth while the major coin is still within the upper portion of the coin track; and by reference to Fig. 23 it will be noted that the said ear 91b does not engage the shoulder 136 until the minor coin is nearly at the lower end of the coin track. By making the radius of curvature of the coin track substantially less at the upper portion, as at 85a in Fig. 23, than at its lower portion 85b the coins are caused to move radially outwardly as they proceed down the track and in consequence the shoulder 136 may be located at a position which is more remote from the axis of rotation of the coin carrier than it otherwise could be. If the curvature of the track 85b were the same as at 85a, and the shoulder 136 were positioned as shown in Fig. 23, the ear 91b would escape the shoulder 136 and thus fail to advance the time indicator; but with the increased radius of curvature at 85b the minor coin allows the coin gauge to move outwardly far enough to engage said shoulder. Because of this change in the coin track the effect is the same as if the difference in diameter betwen major and minor coins were increased by an amount equal to the difference between the radii of the track sectors 85a and 85b. As a result of this change in the coin track contour and the consequently increased difference between the two alternate contact positions of the coin gauge ear 91b, it is not necessary to maintain extremely close manufacturing tolerances with respect to the parts which directly and indirectly control the selective action of the coin gauge.

Referring now to Figs. 11, 18 and 20, let it be assumed that the meter has been set to afford one major unit of time, for example, one hour, and that twenty minutes of the hour have expired when another major coin is deposited and the push plate 41 is depressed. In such circumstances the coin gauge ear 91b will not engage the tooth 133 because that tooth has been retracted too far for the purpose. It would be possible otherwise to obtain much more than two major units of parking time in response to deposit of two such coins. But the tooth 132 is within the sector 85b of the coin track and, save for the provision about to be explained, is not engageable by the ear 91b. This assumes that the increase of radius of the coin track contour at the sector 85b, as compared to the sector 85a, is of such magnitude that the path of the ear 91b is beyond the tip of the tooth 132. Such being the case, a customer then depositing a major coin would obtain no parking time in return. This difficulty has been overcome through the medium of the bellcrank arm 129a that extends radially to a point which coincides with the tips of the teeth 132 and 133, and is provided with an upwardly projecting teat having a short inclined surface 129c which stands in the path of the ear 91b. Whenever one of the two teeth 132 or 133 is in normal position, as per Fig. 18, to be engaged by the ear 91b when the latter is fully depressed by a major coin within the track sector 85a, the upwardly projecting teat on the end of the bellcrank arm 129a holds the coin gauge fixedly in position on the engaging tooth; but if neither of said teeth is in position to be engaged by the ear 91b while the latter continues in its fully depressed position, the teat will engage the ear 91b and its inclined surface will deflect said ear inwardly and hold the same in the inwardly deflected position, thus causing it to drivably engage whichever of the two teeth 132 or 133 it may encounter. In the assumed condition, the ear 91b will engage the tooth 132 and the time control plate 128 will accordingly be rotated through a distance corresponding to a twenty-minute interval. This explanation is equally applicable when the meter has been set to afford two major units of time, after which a third major coin is deposited following a fractional time interval, but in that case the tooth 133 would be engaged instead of the tooth 132. If it be assumed that the meter has been set with minor coins, instead of one or two major coins, and that the time indicator is resultantly at some intermediate scale position not corresponding to a major unit of time, the condition which then obtains is in all respects identical with that which obtains when an interval of time has elapsed following deposit of a major coin.

*The coin gauge made in two parts*

The specific parking meter herein described is adapted to be set to afford a maximum of two major units of parking time in exchange for two major coins, or ten minor coins, or one major coin and five or less minor coins. This fact accounts for the presence of the two teeth 132 and 133 on the time control plate 128. If the meter were designed to afford a maximum of one major unit of parking time, only one such tooth would be needed.

Assuming the time indicator 35 to be at zero when a major coin is deposited and the push plate 41 depressed, the coin gauge ear 91b will engage the tooth 132 and rotate the time control plate through a distance corresponding to one major unit of time. If promptly thereafter another major coin is deposited and the inductor plate 41 is depressed, the coin gauge ear 91b will engage the tooth 133 and rotate the time control plate 128 through a further distance corresponding to an additional major unit of time. But if, following the first operation, a substantial period of time, less than a major unit of time, is allowed to elapse before deposit of the second major coin is made, the time control plate will have rotated in the reverse direction to such an extent that its tooth 133 is no longer engageable by the ear 91b. In that case the ear will again engage the tooth 132, and the customer will obtain only a fractional part of a major unit of time in exchange for a major coin. The peripheral edge of the time control plate 128, at and immediately to the rear of the tip of the tooth 133 is too distant from its axis of rotation to allow the arm 91 of the coin gauge to move inwardly as far as it would normally move under the impetus of a major coin. Consequently, if the coin gauge were made of one piece, instead of comprising the two distinct arms 90 and 91, it would not, under such conditions, be possible for a major coin to enter the coin carrier far enough to permit it to traverse the coin track unless, perhaps, by applying enough force to distort the coin gauge. Because the coin gauge arm 90 is free to move inwardly when its companion arm 91 is obstructed by contact with the point of the tooth 133 or the high surface immediately adjacent thereto, there can be no impediment to complete insertion of a major coin under the condition stated.

*The locating plate and its functions*

The locating plate 18 (see Fig. 5) is of generally rectangular form. It includes two oppositely projecting ears 194 designed to overlie the upper edge of the housing body 10. These ears have sloping upper surface which match a similarly sloping surface on the under side of the ring 16 (see Figs. 1 and 2). When this ring is clamped down by the retainer 14 it bears on the ears 194, and thus firmly secures the locating plate in its down position within a pair of guide slots 194a formed in the housing body (see Figs. 2 and 3). The locating plate also includes an upper laterally projecting lug 195 and a lower laterally projecting lug 196 the former of which extends underneath one side of the top tubular spacers 28 (see Fig. 2) while the latter overlies one of the spacers 28 which is located at an intermediate height. The lugs 195 and 196 determine the vertical location of the meter mechanism M within the housing while at the same time the lower lug 196 determines the horizontal position of the meter mechanism in one direction because it bridges the space between the plates 26 and 27. Location of the meter mechanism in the horizontal direction normal to the principal plane of the locating plate 18 is fixed because the meter mechanism is pressed against the locating plate by the keeper 20 which latter is resilient and bears against the downwardly sloping internal surface of the housing body 10 and thus acts as a wedge to firmly press the meter mechanism against the locating plate.

Formed integrally with the locating plate 18 is a horizontally disposed shelf-like portion 198 which forms a closure for the upper extremity of the opening 22, being located above the manually operable push plate 41. This shelf portion serves also to frustrate any attempt to tamper with the meter by means of a wire or other instrumentality which otherwise could be passed through the opening 22.

In Fig. 13 there are shown the two plates 87 and 88 between which is interposed the plate 86 on which is formed the coin track 85. The plate 87 has an upwardly projecting arm 87a and the plate 88 has a similar arm 88a, and both arms extend above the upper extremity of the plate 86 and conjointly form a slot which is in alignment with the coin slit 40, as well as the coin pocket 75, and long enough to pass a major coin. The two arms 87a and 88a are chamfered as at 87b and 88b for the purpose of facilitating entry of coins into the slot therebetween.

Because this slot is necessarily long enough to pass a major coin, and further because of the chamfered edges 87b and 88b, it might be possible to force two minor coins, side by side, into the said slot and thus jam the meter. To obviate such a contingency, there are formed on the locating plate 18 (see Fig. 5) two parallel fingers 199 spaced apart at their free ends just enough to receive between them the two arms 87a and 88a. When the locating plate 18 is in place, as per Figs. 1 and 2, the two fingers 199 are positioned at either side of the two arms 87a and 88a, and these fingers are so rigid, laterally of the arms, that it is not possible to force two minor coins into the space between the arms. The locating plate 18 has a rectangular opening 200 through which pass the two arms 41c of the manually operable push plate 41, the two fingers 199 both being confined within the width of the space between said arms and freely clearing the same.

The keeper 20 has a lower arm 202 and an upper arm 203. The lower arm 202 has a rectilinear edge 202a which bridges the two frame plates 25 and 26 and bears against the edges thereof; and it also has an extended portion 202b which occupies the gap between the frame plates 26 and 27 and overlies one of the tubular spacers 28 therebetween. The arm 203 has a portion 203a which bears against an edge of the frame plate 25, and a second portion 203b having an ear 203c which bears against an edge of the frame plate 27; also a portion 203d which extends into and bridges the gap between the frame plates 26 and 27, the portion 203d being curved upwardly at its distal end to partially embrace one of the upper tubular spacers 28. The two portions 202b and 203d, both of which are disposed in the gap between the frame plates 26 and 27, are so spaced vertically that they have to be forced into place between the two tubular spacers against which they bear, the keeper being thus removably attached to the frame of the meter mechanism. The keeper 20 is definitely positioned in all directions with respect to the meter mechanism, as is also the locating plate 18. Such being the case, when the meter mechanism M is lowered into the housing body 10, with the locating plate and keeper both attached to the meter mechanism, the meter mechanism will be correctly aligned with the opening 22 and with a coin slot 204 in a plate 205 which is secured within the housing body 10 immediately below the meter mechanism but not attached thereto. The plate 205 serves to prevent unauthorized access to the coin box B.

Although the invention has been described in terms of the specific embodiment, it is to be understood that many of the features thereof are of broad application and are to be limited only by the terms of the appended claims.

I claim:

1. In a coin operated parking meter, in combination, time indicating means including a pointer movable from zero to a time indicating position, mechanism for moving the pointer from zero to a time indicating position including a rotatable drive member and a power plate rotatable from a normal position to an alternate position, a primary spring connected to the power plate for energizing the mechanism and biasing the power plate toward normal position, timing mechanism, including a slip clutch connected to the drive member, for moving the time indicator to zero position, a timing spring for energizing the timing mechanism, a coin inductor movable with the insertion of a coin, a link connecting the inductor to the power plate to rotate the plate to alternate position upon movement of the inductor to store power in the primary spring, means operating automatically upon movement of the power plate to said alternate position to disconnect the link therefrom to free the power plate for return rotation, with return rotation of the power plate under the influence of the primary spring serving to rotate the drive member to move the pointer from zero to a time indicating position, a second link on the coin inductor, a rotatable winding plate for winding the timing spring, and means on the winding plate adapted to be contacted by the second link and moved thereby with movement of the inductor upon the insertion of a coin to rotate the winding plate, said last named means being moved by the second link to a position out of reach of the second link with movement of the inductor upon the immediate insertion of a second coin, whereby to prevent overwinding of the timing spring.

2. In a coin operated parking meter, in combination, time indicating means including a pointer movable from zero to a time indicating position, mechanism for moving the pointer from zero to a time indicating position including a rotatable drive member and a power plate rotatable from a normal position to an alternate position, a primary spring connected to the power plate for energizing the mechanism and biasing the power plate toward normal position, timing mechanism including a slip clutch connected to the drive member for moving the time indicator to zero position, a timing spring for energizing the timing mechanism, a coin inductor movable with the insertion of a coin, a link connecting the inductor to the power plate to rotate the plate to alternate position upon movement of the inductor to store the power in the primary spring, means operating automatically upon movement of the power plate to said alternate position to disconnect the link therefrom to free the power plate for return rotation, with return rotation of the power plate under the influence of the primary spring serving to rotate the drive member to move the pointer from zero to a time indicating position, a second link on the coin inductor, a rotatable winding plate for winding the timing spring, a first finger on the winding plate to be contacted by the second link and moved thereby with movement of the inductor upon the insertion of a coin to rotate the winding plate and to position said finger out of reach of the second link upon substantially immediately following movement of the inductor, a second finger on the winding plate adapted to be contacted by the second link with movement of the inductor upon the immediate insertion of a second coin further to rotate the winding plate and to position said second finger out of reach of the second link upon substantially immediately following movement of the inductor, whereby to prevent overwinding of the second spring.

3. In a coin operated parking meter, in combination, time indicating means including a pointer movable from zero to a time indicating position, mechanism for moving the pointer from zero to a time indicating position including a rotatable drive member and a power plate rotatable from a normal position to an alternate position, a primary spring connected to the power plate for energizing the mechanism and biasing the power plate toward normal position, timing mechanism including a slip clutch connected to the drive member for moving the time indicator to zero position, a timing spring for energizing the timing mechanism, a coin inductor movable with the insertion of a coin, a link connecting the inductor to the power plate to rotate the plate to alternate position upon movement of the inductor to store the power in the primary spring, means operating automatically upon movement of the power plate to said alternate position to disconnect the link therefrom to free the power plate for return rotation, with return rotation of the power plate under the influence of the primary spring serving to rotate the drive member to move the pointer from zero to a time indicating position, a second link on the coin inductor, a rotatable hub to which one end to the timing spring is secured, a connector plate fixed on the hub, a winding plate mounted for rotation relative to the connector plate, a lost motion connection between the winding plate and the connector plate, a first finger on the winding plate to be contacted by the second link and moved thereby with movement of the inductor upon the insertion of a coin to rotate the winding plate and to position said finger out of reach of the second link upon substantially immediately following movement of the inductor, a second finger on the winding plate adapted to be contacted by the second link with movement of the inductor upon substantially immediate insertion of a second coin further to rotate the winding plate and to position said second finger out of reach of the second link upon substantially immediately following movement of the inductor.

4. In a coin operated parking meter, in combination, a power plate rotatable from a normal position to an alternate position, a roller carried by the power plate at a point remote from the axis of rotation thereof, a spring biasing the power plate toward its normal position, a coin carrier rotatable from a coin receiving position to a coin discharge position, means adapted to connect the power plate to the coin carrier only during rotation of the power plate from alternate to normal position to rotate the coin carrier therewith toward coin discharge position, a manually movable coin inductor, a link pivoted at one end to the inductor and provided with an arcuate portion adapted to contact the roller to rotate the power plate to alternate position with movement of the inductor, a lip formed at the other end of the link, and a segmental cam plate fixed to the coin carrier and positioned thereon to contact the lip with rotation of the coin carrier toward coin discharge position to lift the link out of contact with the roller.

5. In a coin operated parking meter, in combination, a power plate rotatable from a normal position to an alternate position, a spring biasing the power plate toward its normal position, a coin carrier rotatable from a coin receiving position to a coin discharge position, means adapted to connect the power plate to the coin carrier only during rotation of the power plate from alternate to normal position to rotate the coin carrier therewith toward coin discharge position, a manually movable coin inductor, a link pivotally mounted on the inductor and provided with a portion adapted to contact the power plate to rotate the power plate to alternate position with movement of the inductor, and means fixed to the coin carrier and positioned thereon to contact the link with rotation of the coin carrier toward coin discharge position to lift the link out of contact with the power plate.

6. In a coin operated parking meter, in combination, a power plate rotatable from a normal position to an alternate position, engaging means carried by the power plate at a point remote from the axis of rotation thereof, a spring biasing the power plate toward its normal position, a member rotatable from a first position to a second position, means adapted to connect the power plate to the rotatable member only during rotation of the power plate from alternate to normal position to rotate the member therewith, a manually movable element, a link pivotally mounted on the element and adapted to contact the engaging means to rotate the power plate to alternate position with movement of the element, and means carried by the rotatable member and positioned thereon to contact the link with rotation of the element toward its second position to move the link out of contact with the engaging means.

7. In a coin operated device, in combination, a first member rotatable from a normal position to an alternate position, engaging means carried by the member at a point remote from the axis of rotation thereof, means biasing the member toward its normal position, a second member rotatable from a first position to a second position, means adapted to connect the first member to the second member only during rotation of the first member from alternate to normal position to rotate the second member therewith toward its second position, a manually movable element, a link pivotally mounted on the element and adapted to contact the engaging means to rotate the first member to alternate position with movement of the element, and means carried by the second member and positioned thereon to contact the link with rotation of the second member toward its second position to move the link out of contact with the engaging means.

References Cited in the file of this patent

UNITED STATES PATENTS

| Number | Name | Date |
|---|---|---|
| 2,308,836 | Sisk | Jan. 19, 1943 |
| 2,318,615 | Martin | May 11, 1943 |